(12) United States Patent
Narikawa et al.

(10) Patent No.: US 10,719,171 B2
(45) Date of Patent: *Jul. 21, 2020

(54) PROJECTION TYPE IMAGE DISPLAY DEVICE, MANIPULATION DETECTION DEVICE AND PROJECTION TYPE IMAGE DISPLAY METHOD

(71) Applicant: Maxell, Ltd., Kyoto (JP)

(72) Inventors: Sakiko Narikawa, Tokyo (JP); Takashi Matsubara, Tokyo (JP); Naoki Mori, Tokyo (JP)

(73) Assignee: Maxell, Ltd., Kyoto (JP)

( * ) Notice: Subject to any disclaimer, the term of this patent is extended or adjusted under 35 U.S.C. 154(b) by 222 days.

This patent is subject to a terminal disclaimer.

(21) Appl. No.: 16/009,628

(22) Filed: Jun. 15, 2018

(65) Prior Publication Data

US 2018/0292950 A1  Oct. 11, 2018

Related U.S. Application Data

(63) Continuation of application No. 15/027,340, filed as application No. PCT/JP2013/077304 on Oct. 8, 2013, now Pat. No. 10,025,430.

(51) Int. Cl.
*G06F 3/042* (2006.01)
*H04N 9/31* (2006.01)
*G06F 3/0354* (2013.01)

(52) U.S. Cl.
CPC ........ *G06F 3/0425* (2013.01); *G06F 3/03542* (2013.01); *G06F 3/03545* (2013.01); *H04N 9/3141* (2013.01); *H04N 9/3194* (2013.01)

(58) Field of Classification Search
CPC ............................................ G06F 3/042–0428
See application file for complete search history.

(56) References Cited

U.S. PATENT DOCUMENTS 6,100,538 A    8/2000  Ogawa
6,963,937 B1 * 11/2005  Kamper ................. G06F 3/038
                                                    345/156

(Continued)

FOREIGN PATENT DOCUMENTS

JP      2001-273091 A    10/2001
JP      2007-086962 A     4/2007

(Continued)

OTHER PUBLICATIONS

Extended European Search Report received in corresponding European Application No. 13895170.2 dated May 19, 2017.

(Continued)

*Primary Examiner* — Patrick F Marinelli
(74) *Attorney, Agent, or Firm* — Mattingly & Malur, PC

(57) ABSTRACT

A projection type image display device correctly detects the position of contact of an electronic pen and a finger on a manipulation surface without the provision of a touch sensor. Light containing an image is projected, illuminating light that is different from the light containing the image is projected onto a manipulation surface which at least partially overlaps an image projection surface onto which the light has been projected, and an image of the manipulation surface is captured. A first detection process detects the position at which a first object being manipulated, a distal end of which emits light, touches the manipulation surface, a second detection process detects the position at which a second object being manipulated, which does not emit light, touches the manipulation surface, and at least part of the image being displayed is changed on the basis of the detection result from either detection process.

6 Claims, 28 Drawing Sheets

(56) References Cited

U.S. PATENT DOCUMENTS

| | | | | |
|---|---|---|---|---|
| 7,456,824 | B2* | 11/2008 | Yoshimura | G06F 3/03545 178/18.01 |
| 7,460,110 | B2* | 12/2008 | Ung | G06F 3/03545 178/18.03 |
| 8,514,187 | B2* | 8/2013 | Dickinson | G06F 3/0416 345/173 |
| 9,639,165 | B2* | 5/2017 | Naess | G06F 3/017 |
| 2001/0055060 | A1 | 12/2001 | Kitazawa | |
| 2005/0001824 | A1* | 1/2005 | Yoshimura | G06F 3/03545 345/179 |
| 2006/0244719 | A1 | 11/2006 | Brigham, II et al. | |
| 2007/0188445 | A1 | 8/2007 | Silverstein et al. | |
| 2007/0222760 | A1 | 9/2007 | Lieberman et al. | |
| 2007/0242056 | A1* | 10/2007 | Engelhardt | G06F 3/0416 345/173 |
| 2009/0278812 | A1* | 11/2009 | Yasutake | G06F 3/04815 345/173 |
| 2010/0207910 | A1* | 8/2010 | Liu | G06F 3/0416 345/175 |
| 2011/0164001 | A1* | 7/2011 | Seo | G06F 3/03545 345/179 |
| 2011/0169756 | A1 | 7/2011 | Ogawa et al. | |
| 2013/0002542 | A1* | 1/2013 | Ishida | G06F 3/0416 345/156 |
| 2013/0124207 | A1* | 5/2013 | Sarin | G10L 15/22 704/275 |
| 2013/0135260 | A1* | 5/2013 | Damhaug | G06F 3/0304 345/175 |
| 2013/0147711 | A1* | 6/2013 | Njolstad | G06F 3/011 345/158 |
| 2013/0162538 | A1 | 6/2013 | Ichieda | |
| 2013/0257811 | A1* | 10/2013 | Usuda | G06F 3/0425 345/175 |
| 2013/0328833 | A1* | 12/2013 | Hsieh | G06F 3/0304 345/175 |
| 2014/0307174 | A1* | 10/2014 | Zhu | B43L 1/00 348/739 |
| 2014/0313165 | A1* | 10/2014 | Lam | H04N 9/3179 345/175 |
| 2014/0313166 | A1* | 10/2014 | Rattray | H04N 9/3179 345/175 |
| 2014/0354605 | A1* | 12/2014 | Kurita | G06F 3/03545 345/179 |
| 2015/0177861 | A1* | 6/2015 | McCaughan | G06F 3/03545 345/173 |
| 2015/0205377 | A1* | 7/2015 | Koyama | G06F 3/0325 345/156 |
| 2015/0261328 | A1* | 9/2015 | Nagano | G06F 3/03545 345/179 |
| 2015/0338998 | A1* | 11/2015 | Chathoth | G06F 3/0425 345/175 |
| 2015/0355781 | A1* | 12/2015 | Lin | G06F 3/0425 345/175 |
| 2016/0041632 | A1* | 2/2016 | Ono | G06F 3/03542 345/175 |
| 2016/0077670 | A1* | 3/2016 | Short | G06F 1/1605 345/175 |
| 2016/0189328 | A1* | 6/2016 | Vranjes | G06F 3/0488 345/173 |
| 2016/0239154 | A1* | 8/2016 | Suggs | H04N 9/3194 |
| 2016/0253043 | A1* | 9/2016 | Narikawa | G06F 3/03542 348/744 |
| 2016/0274733 | A1* | 9/2016 | Hasegawa | G06F 3/048 |
| 2016/0282961 | A1* | 9/2016 | Moussakhani | H04N 9/3185 |
| 2016/0334921 | A1* | 11/2016 | Oakley | G06F 3/0416 |
| 2016/0342258 | A1* | 11/2016 | Han | G06F 3/033 |
| 2017/0097737 | A1* | 4/2017 | Ota | G06F 3/0425 |
| 2017/0115855 | A1* | 4/2017 | Farouki | H04L 12/1822 |
| 2017/0153728 | A1* | 6/2017 | Takahashi | G06F 3/041 |

FOREIGN PATENT DOCUMENTS

| | | |
|---|---|---|
| JP | 2008-059283 A | 3/2008 |
| JP | 2011-143557 A | 7/2011 |
| JP | 2011-239948 A | 12/2011 |
| JP | 2013-134661 A | 7/2013 |
| WO | 2013/104060 A1 | 7/2013 |
| WO | 2013/111447 A1 | 8/2013 |

OTHER PUBLICATIONS

International Search Report of PCT/JP2013/077304 dated Jan. 7, 2014.

* cited by examiner

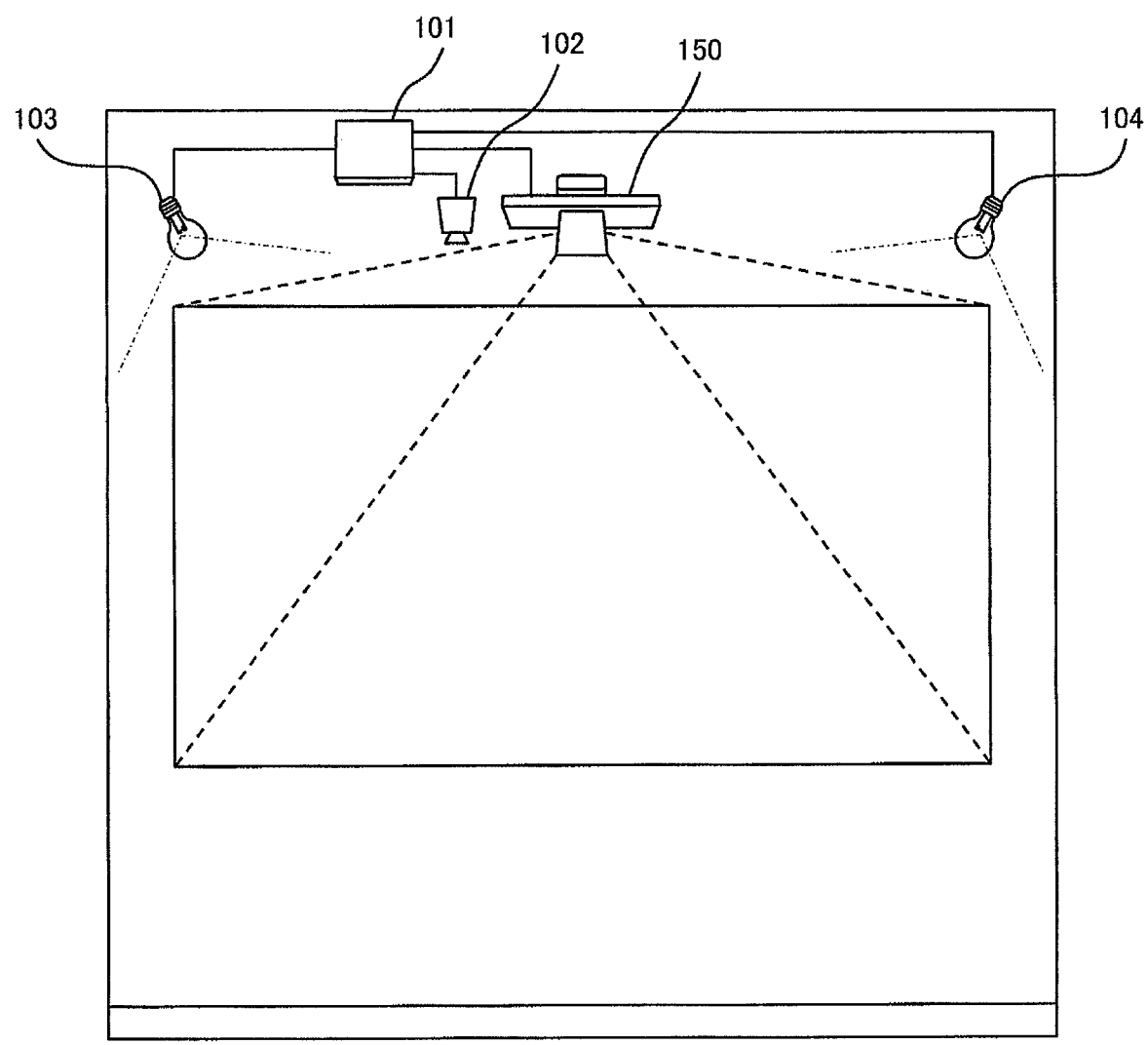
F I G. 3

STATE WHERE OPERATED BY FINGER/FRONT VIEW

STATE WHERE OPERATED BY FINGER/SIDE VIEW

STATE WHERE OPERATED BY ELECTRONIC PEN/FRONT VIEW

STATE WHERE OPERATED BY ELECTRONIC PEN/SIDE VIEW

STRUCTURE OF ELECTRONIC PEN

ELECTRONIC PEN STATE DURING NON-TIP CONTACT

F I G. 5 C
ELECTRONIC PEN STATE DURING TIP CONTACT
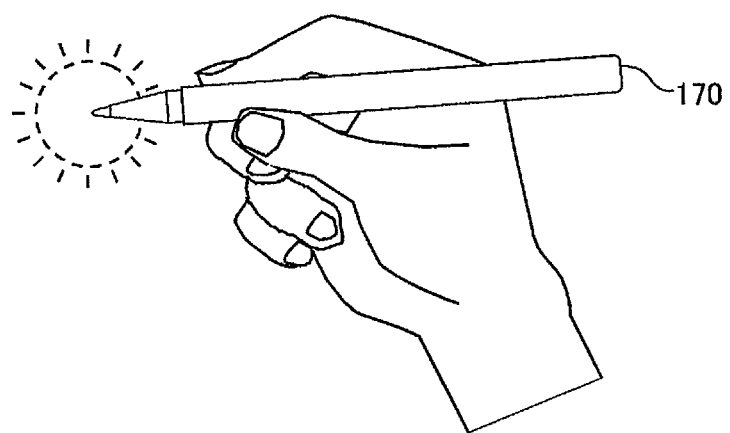

S602 IN DETAIL

|  | SURFACE AREA S | CIRCUMFERENCE L | LONGITUDINAL MAX LENGTH H | LATERAL MAX LENGTH W | ASPECT RATIO R (R=H/W) |
|---|---|---|---|---|---|
| UPPER VALUE | Smax | Lmax | Hmax | Wmax | Rmax |
| LOWER VALUE | Smin | Lmin | Hmin | Wmin | Rmin |

F I G. 6 C
S602, S603 DETAILS
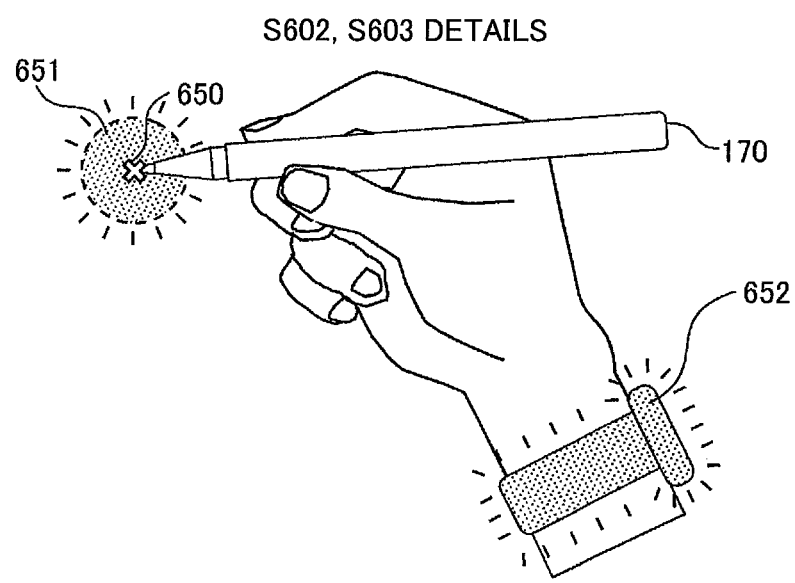
F I G. 7 A
SHADOW DURING NON-CONTACT/FRONTAL VIEW
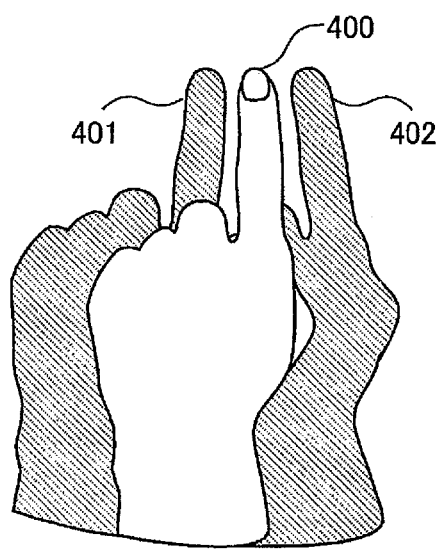

F I G. 7 B
SHADOW DURING NON-CONTACT /TOP VIEW
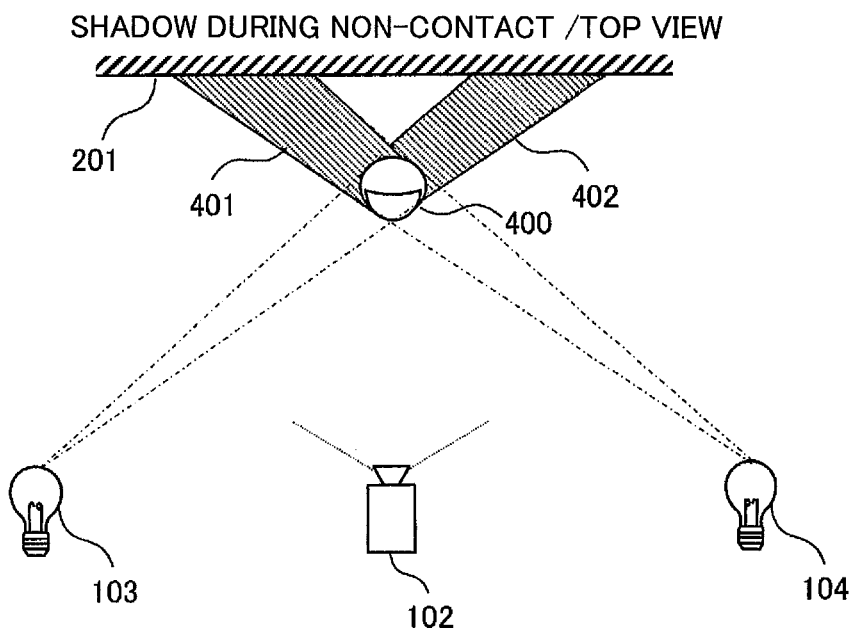
F I G. 7 C
SHADOW DURING CONTACT/FRONTAL VIEW
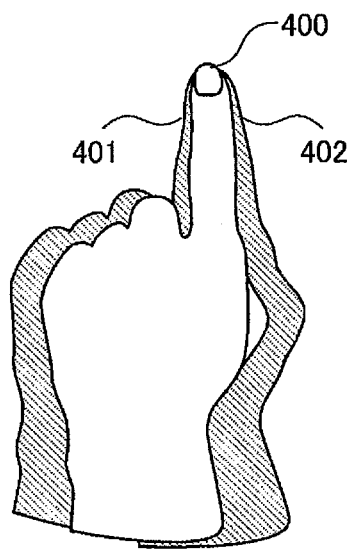

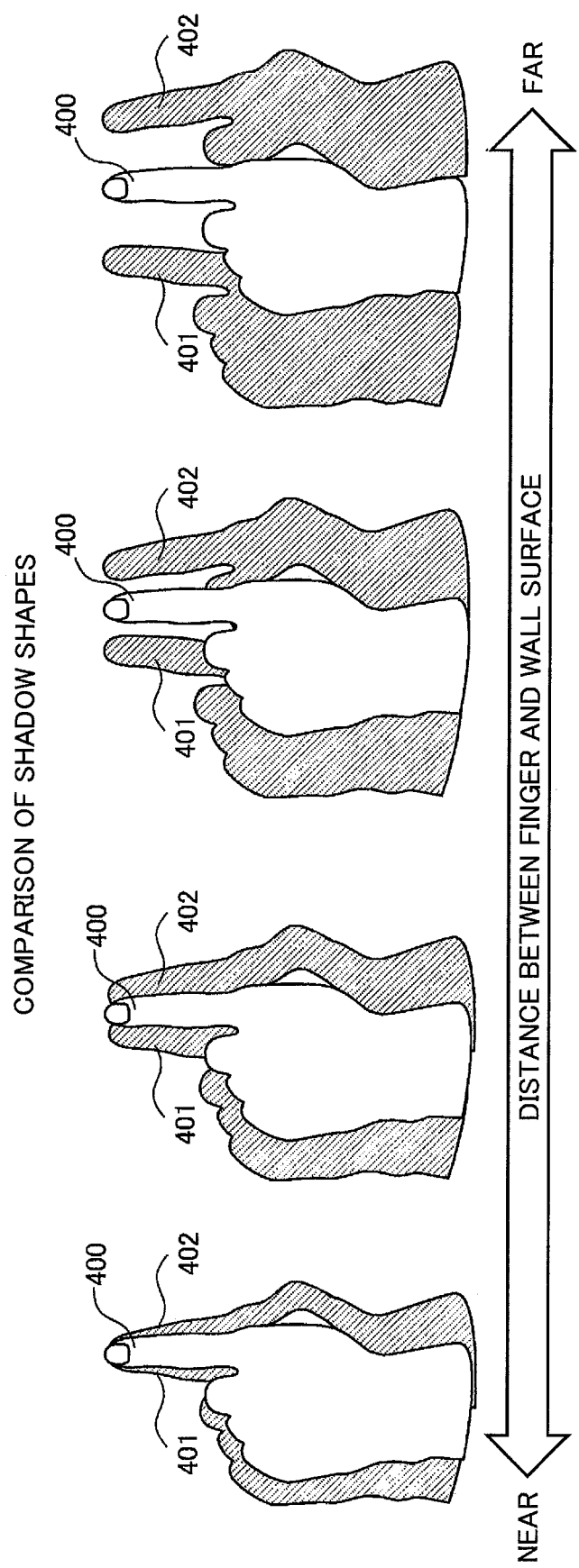

DISTANCE FOR TWO SHADOWS

DISTANCE FOR TWO SHADOWS

STATE WHERE OPERATING WHERE OPERATING WITH DIFFERENT MANIPULATION OBJECTS

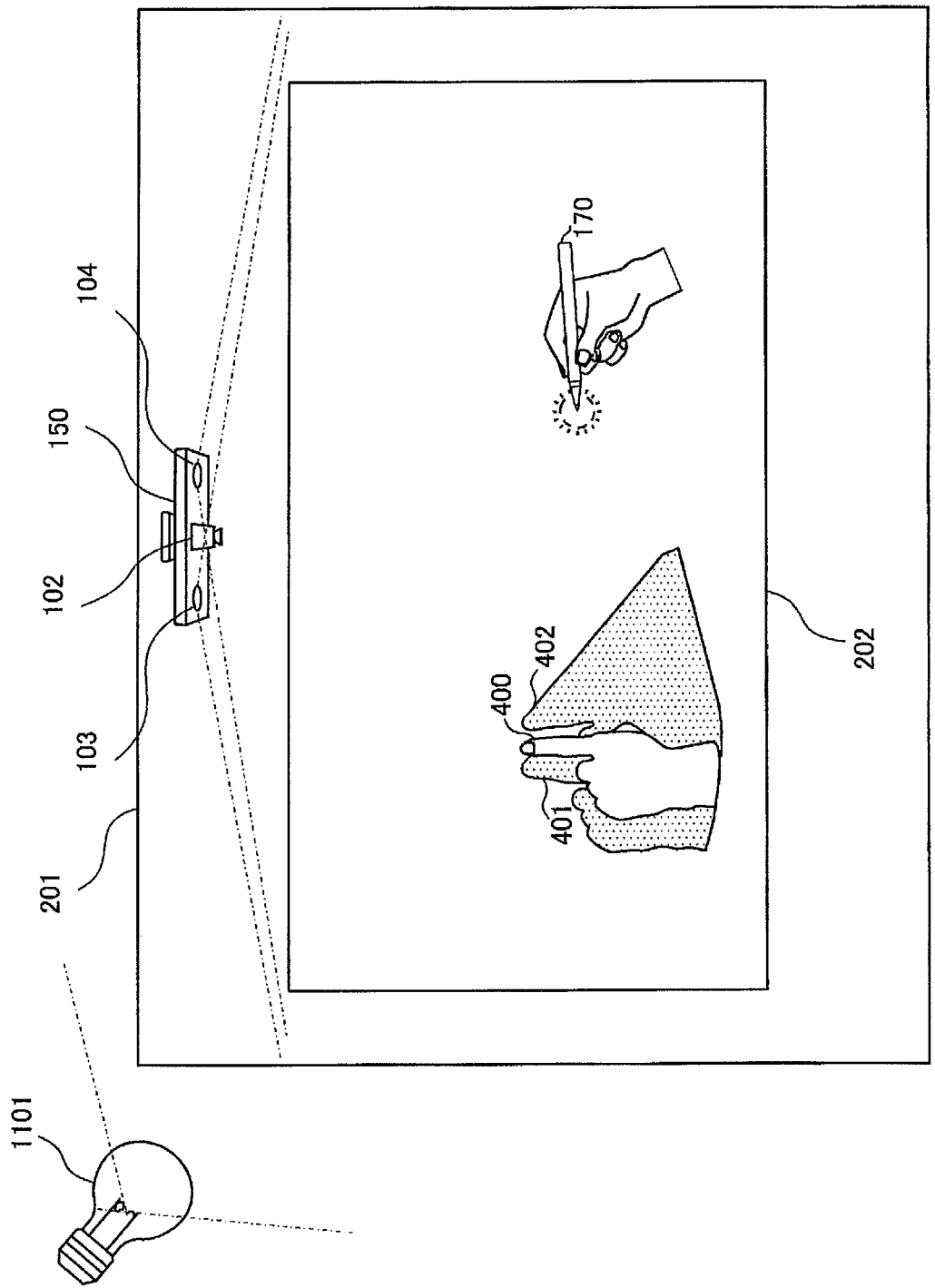

F I G. 1 3 A
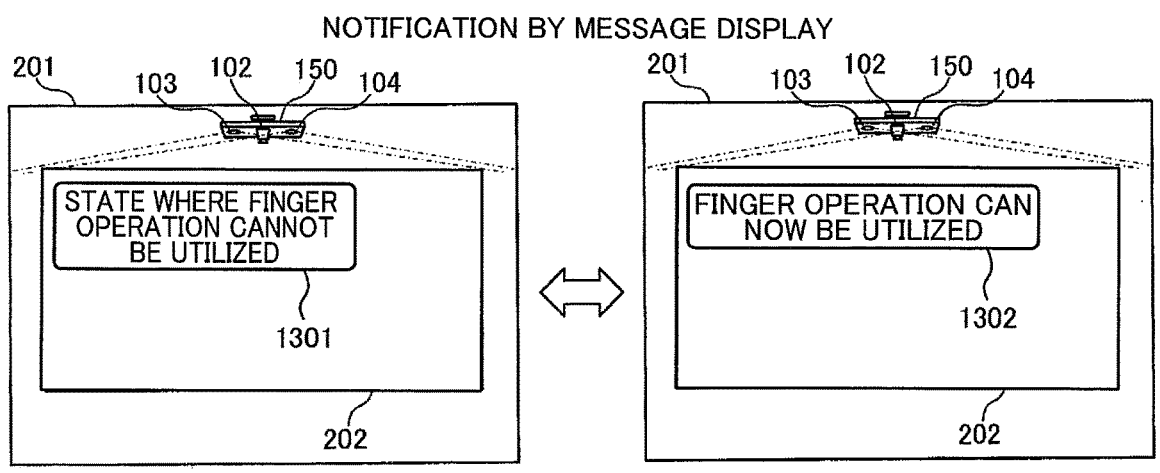

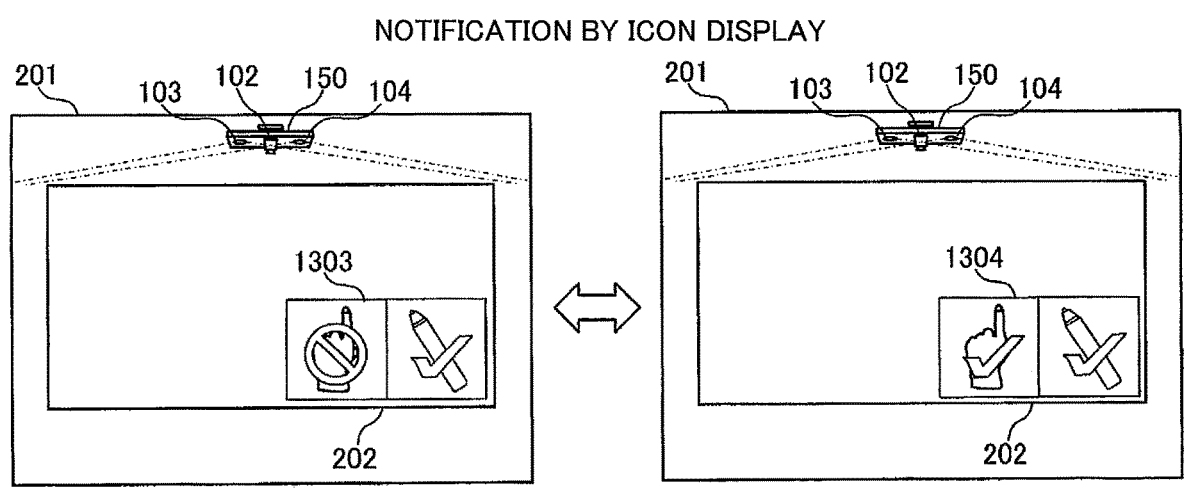
F I G. 1 3 B

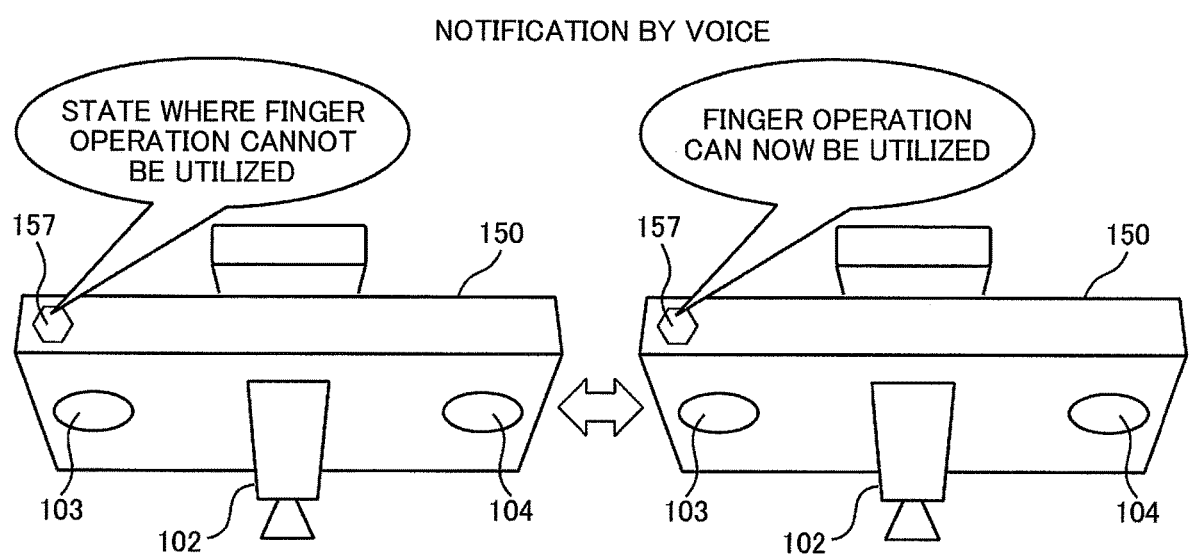
F I G. 1 4 C

F I G. 1 5

| SETUP MENU | | |
|---|---|---|
| NOTIFICATION WHEN FINGER OPERATION CANNOT BE UTILIZED | ON | OFF |
| NOTIFICATION BY MESSAGE DISPLAY (MAIN UNIT) | ON | OFF |
| NOTIFICATION BY MESSAGE DISPLAY (PROJECTION SURFACE) | ON | OFF |
| NOTIFICATION BY ICON DISPLAY | ON | OFF |
| NOTIFICATION BY VOICE | ON | OFF |
| NOTIFICATION BY ERROR LAMP | ON | OFF |

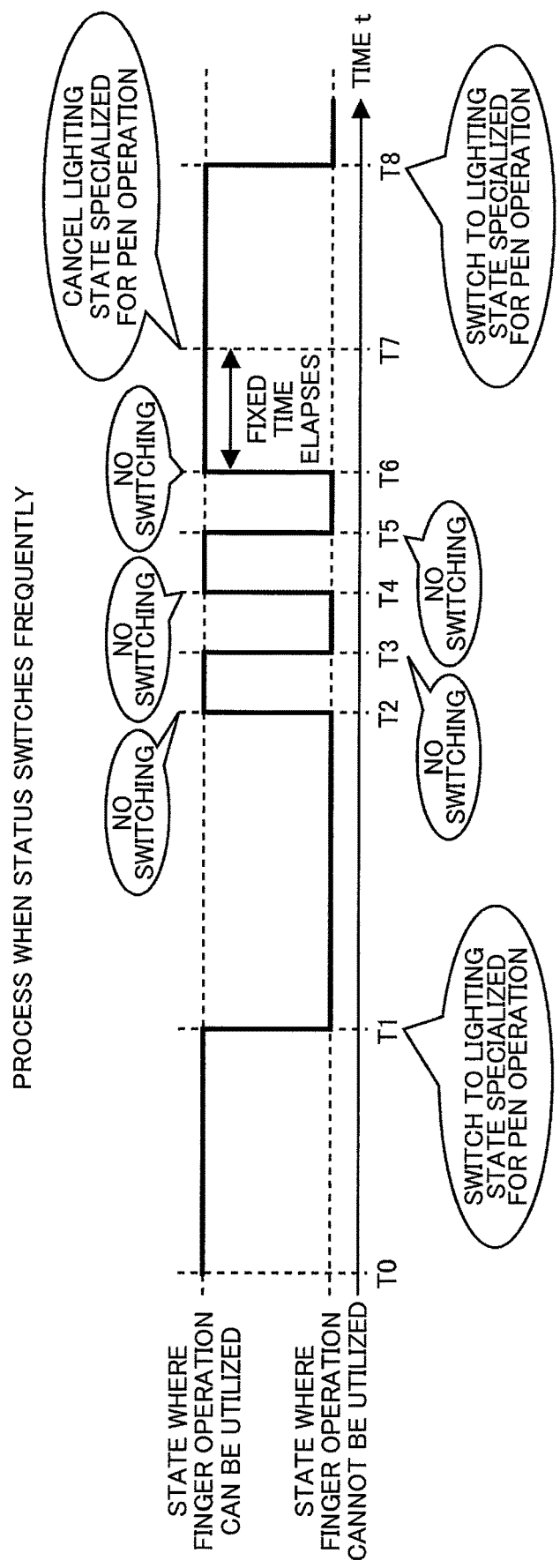

PROJECTION TYPE IMAGE DISPLAY DEVICE, MANIPULATION DETECTION DEVICE AND PROJECTION TYPE IMAGE DISPLAY METHOD

TECHNICAL FIELD

The present invention relates to a projection type display device, manipulation detection device and projection type image display method capable of being operated by the user.

BACKGROUND ART

Patent Literature 1 describes a manipulation detection device and program thereof (see paragraph [0007] of the specifications) having the object of "detecting manipulation information without utilizing a special device" (see paragraph [0006] of the specifications), and in order to achieve that objective, is a "manipulation detection device also utilizing an illuminating means and image capture means, and including a means to capture an image of the operator in a state where illuminated by the illuminating means; a means to detect the region of a specific section of the operator based on image data of the operator that is obtained by way of the image capture means; and a means to extract the shadow section from the region of a specific section of the operator that was detected; and a means to detect plural lines whose edges form a straight line (or that form a straight line at the edge), and detect points where the detected lines jointly intersect as acute angles, and to detect that intersection point as the pointing position" by the operator within a region of a specific section of the operator.

Patent Literature 2 describes an electronic pen system (see paragraph [0009] of the specifications) with the problem of "providing an electronic pen system including an electronic pen capable of parallel equivalent usage of the finger and electronic pen (see paragraph [0008] of the specifications), and as a means to resolve that problem, is an "electronic pen system containing a touch panel including a touch surface on which a touch operation is performed by the electronic pen and finger, and a position detection device to detect the electronic pen and the finger touch positions on the touch surface, and a display device to display the required image as the display screen of the touch surface, and a control device to display an image on the display device corresponding to the position detection information that is acquired from the position detection device; and characterized in that the control device includes an instruction object judgment means to judge whether the position detection information is from the electronic pen or the finger when the position detection information is received from the position detection device, a first control means to perform the specified pen input processing corresponding to touch operation by the electronic pen, and a second control means to perform the specified finger input processing corresponding to touch operation by the specified finger input; and further executing the first control means for pen input processing and the second control means for finger input processing in parallel.

CITATION LIST

Patent Literature

PTL 1: Japanese Patent Application Laid-Open No. 2008-59283

PTL 2: Japanese Patent Application Laid-Open No. 2011-143557

SUMMARY OF INVENTION

Technical Problem

In Patent Literature 1, an image of the specified section of the user illuminated by the lighting is captured and the indicating action and that position are detected based on the captured image data. However, operation cannot be performed by using the electronic pen since no consideration is given to the user gripping the object and performing operation.

In Patent Literature 2, the touch positions of the electronic pen and the finger are detected on the touch surface by utilizing the touch panel. However, the position detection device that detects the touch position is integrated into the touch panel, so unless sensors are installed, the touch position cannot be detected on the operating screen.

Solution to Problem

In order to resolve the aforementioned problems, the structure as described for example in the claims is utilized.

The present invention contains plural means for resolving the aforementioned problems, and as a representative example, one aspect of the present invention is a projection type image display device that projects and displays an image; and as unique features includes an image projecting unit that projects an image; at least one or more lighting units to illuminate an illuminating light that is different from the projection light from the image projecting unit onto a manipulation surface which at least partially overlaps an image projection surface onto which the image projecting unit has projected an image; an image capture unit to capture the manipulation surface; a first detection unit to perform a first detection process for detecting the position where a first object being manipulated that emits light from the distal end contacts the manipulation surface; a second detection unit to perform a second detection process to detect the position that a second object being manipulated that does not emit light contacts a manipulation surface and that is different from the first detection process; and a control unit to control the operation of the projection type image display device, to change at least a portion of the image that is projected by the image projecting unit based on detection results from either the first detection unit or the second detection unit.

Another aspect of the present invention is a manipulation detection device to detect the operation in order to operate the projection type image display device that projects and displays an image, and as unique features includes a first detection unit to perform a first detection process that detects the position where a first object being manipulated that emits light from the distal end contacts the manipulation surface, and a second detection unit to perform a second detection process different from the first detection process to detect the position where a second object being manipulated that does not emit light contacts a manipulation surface.

Another aspect of the present invention is a projection type image display method that projects and displays an image, and as unique features projects an image, emits an illuminating light different from the projecting light containing the image onto a manipulation surface that at least partially overlaps an image projection surface on which the projected image is projected, captures the image, performs a first detection process that detects the position where a first object being manipulated that emits light from the distal end contacts the manipulation surface, and a second detection process different from the first detection process to detect the position where a second object being manipulated that does not emit light contacts a manipulation surface; and that changes at least part of the image being projected based on the detection results from the first detection process or the second detection process.

Advantageous Effects of Invention

The present invention renders the effect that a projection type image display device, a manipulation detection device, and a projection type image display method can be provided to detect the position that the electronic pen and finger contact the manipulation surface correctly without installing touch sensors on the manipulation surface, and also improve the user operability.

BRIEF DESCRIPTION OF DRAWINGS

FIG. 3 is an external view of the manipulation detection device of the structure of the second example.

FIG. 5C is a drawing showing the state when the electronic pen tip is making contact.

FIG. 6C is a drawing showing an example in detail of S602 and S603 in FIG. 6A.

FIG. 7A is a frontal view showing an example of the shape of the shadow when the finger and the wall surface are not in contact.

FIG. 7B is a top view showing an example of the shape of the shadow when the finger and the wall surface are not in contact.

FIG. 7C is a frontal view showing an example of the shape of the shadow when the finger and the wall surface are in contact.

FIG. 8A is a drawing showing an example of the difference in shapes of the shadow due to the distance between the finger and the wall surface.

FIG. 11 is a drawing showing an example of the state where light from an external source is emitted onto a wall surface.

FIG. 13A is a drawing showing an example of the state for displaying a message indicating that operation by finger cannot be utilized.

FIG. 13B is a drawing showing an example of the state for displaying an icon indicating that operation by finger cannot be utilized.

FIG. 14C is a drawing showing an example of the state for notifying by voice that operation by finger cannot be utilized.

FIG. 15 is a drawing showing an example of a menu presented to the user.

FIG. 16B is a drawing showing an example of the process when the state is frequently switching in FIG. 16A.

DESCRIPTION OF EMBODIMENTS

Figure 1:
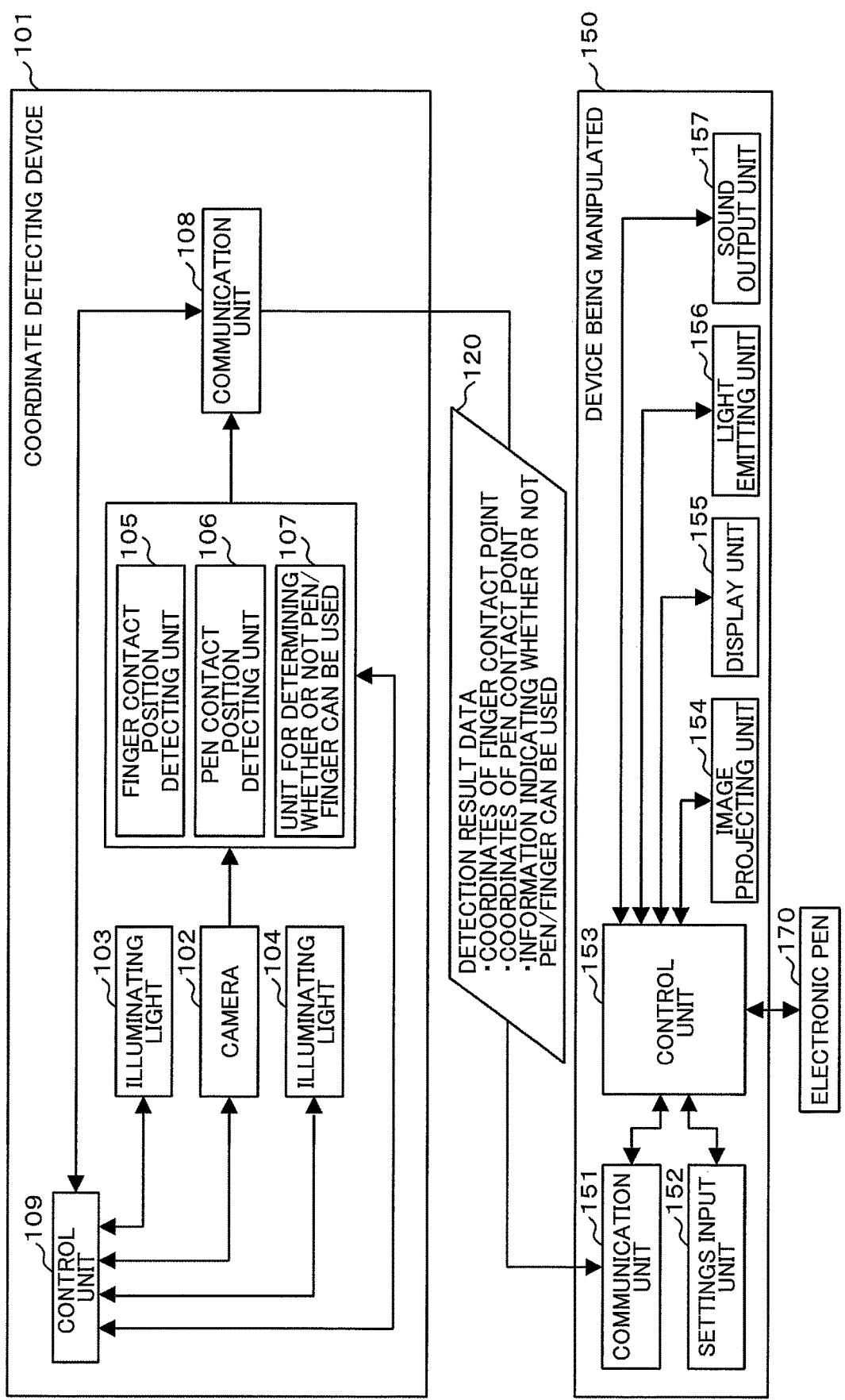
FIG. 1 is a block diagram showing a first example of the structure of the manipulation detection device.

Examples are hereinafter described while referring to the drawings.

Example 1

In Example 1, a description utilizing one camera and two illuminating lights is given of the method to detect the electronic pen contact point coordinates, and the finger contact point coordinates for example without mounting a touch sensor, etc.

FIG. 1 is a block diagram showing a first example of the structure of the manipulation detection device.

Figure 2:
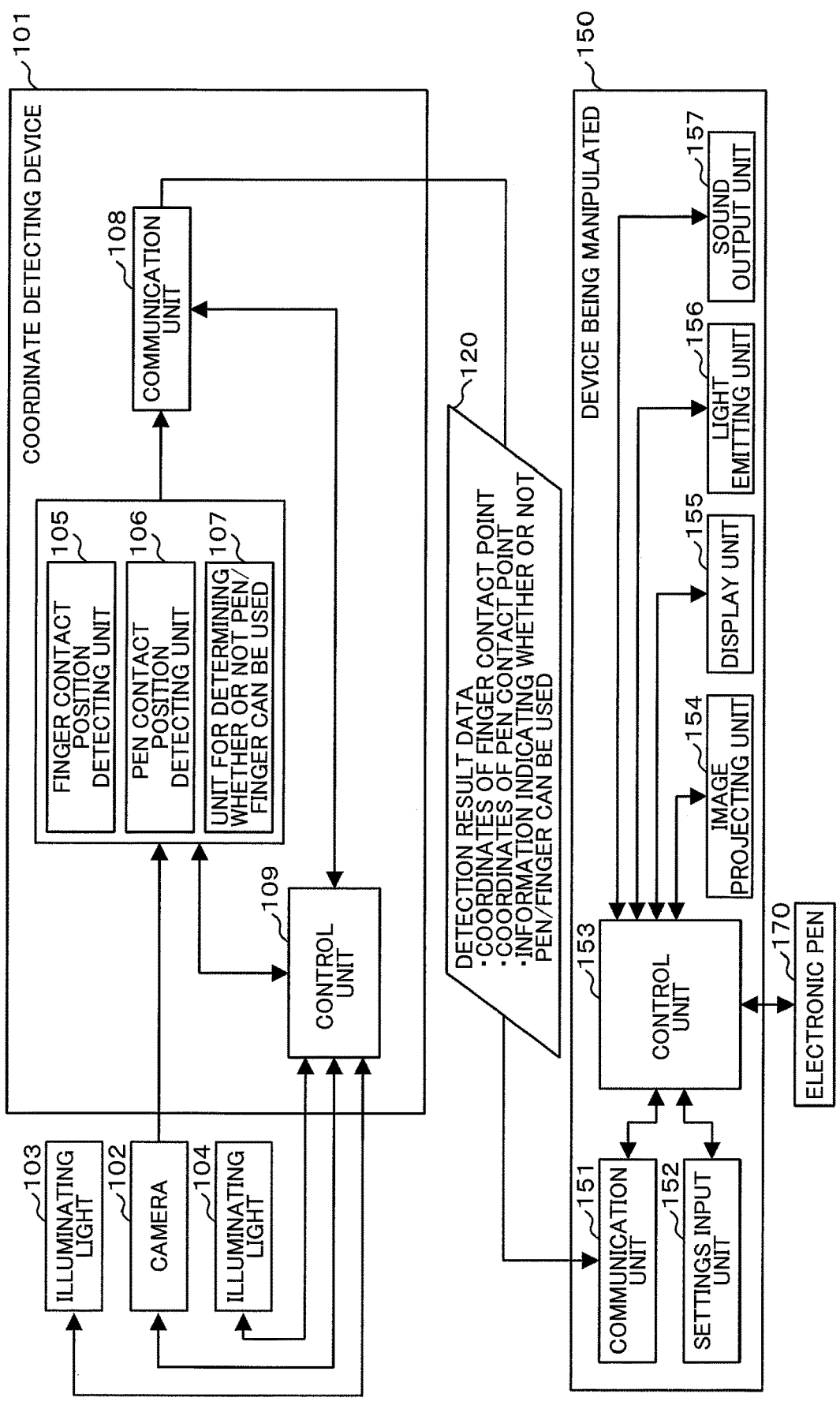
FIG. 2 is a block diagram showing a second example of the structure of the manipulation detection device.

FIG. 2 is a block diagram showing a second example of the structure of the manipulation detection device.

FIG. 3 is an overview diagram of the manipulation detection device utilizing the structure of the second example.

In FIG. 1 and FIG. 2, the reference numeral 101 denotes a coordinate detecting device, 102 denotes a camera (hereafter, also called an image capture unit), 103 and 104 are illuminating light, 105 is a finger contact position detecting unit, 106 is a pen contact position detecting unit, 107 is a unit for determining whether or not pen/finger can be used, 108 is a communication unit, and 109 is a control unit. Reference numeral 150 denotes the device being manipulated, 151 is a communication unit, 152 is a settings input unit, 153 is a control unit, 154 is an image projecting unit, 155 is a display unit, 156 is a light emitting unit, and 157 is a sound output unit. The reference numeral 120 denotes detection result data, and 170 is an electronic pen.

In FIG. 1, each of the sections 102 to 109, 151 to 157 are separate but if required may be configured as one or as plural structures. The sections 105 to 107 for example can be configured to execute CPU processing by one or plural central processing units (CPU). Also, each of the sections 102 to 109 in FIG. 1, can all be included inside the coordinate detection device 101, and each of the sections 151 to 157 can all be included inside the device being manipulated 150, however as shown in FIG. 2 and FIG. 3 may have one or more structural elements in an outside section, and may also be connected by way of network connection or a universal serial bus (USB) connection. Alternatively, the coordinate detection device 101 and the device being manipulated 150 may be connected and configured as one overall device.

The camera 102 contains an image sensor, lens and filter, etc. and captures images.

The illuminating lights 103 and 104 include a light emitting diode, a circuit board, and a lens, etc. and illuminate the region for image capture by the camera 102. Besides a constantly lit state, the illuminating lights 103, 104 may each be made to flash so as to alternately light up and in addition, may both be turned off during switching of the illuminating lights 103, 104. Alternatively, the illuminating lights 103, 104, may also be made to flash at the same timing. The illuminating light may be non-visible light and for example the camera 102, and the illuminating lights 103, 104 may be an infrared camera and infrared illuminating lights and capture infrared images and may also perform processing to detect the subsequently described finger contact position. A filter may be added to the infrared camera when configuring the infrared camera and infrared illuminating lights, and an image may be captured while blocking out all or a portion of the light that is not within the infrared region.

The finger contact position detecting unit 105 includes a circuit board and software etc. and detects the finger contact position from the image that is captured by the camera 102. The method for detecting the finger contact position is described later on while referring to FIG. 9.

The pen contact position detecting unit 106 includes a circuit board and software etc. and detects the contact position of the electronic pen 170 from the image that is captured by the camera 102. The method for detecting the electronic pen contact position is described later on while referring to FIG. 6A to FIG. 6C.

The unit for determining whether or not pen/finger can be used 107 includes a circuit board and software etc. and judges whether or not operation by finger from the image that is captured by the camera 102 can be used. The method for judgment is described later on while referring to FIG. 11.

The communication unit 108 includes a network connection or USB connection, an ultrasonic unit, an infrared communication unit, etc. and is an interface capable of communicating with devices outside of the coordinate detection device such as a display and projector, etc.

The control unit 109 includes a circuit board and software etc. and controls the camera 102, the illuminating light 103, the illuminating light 104, the finger contact position detecting unit 105, the pen contact position detecting unit 106, unit for determining whether or not pen/finger can be used 107, and the communication unit 108.

The detection result data 120 is data that is output by the coordinate detection device 101 to the device being manipulated 150 by way of the communications unit 108, and includes the finger contact position coordinates, the pen contact position coordinates, and pen/finger usable-not usable information, etc. The device being manipulated 150 is for example a projector, and receives the detection result data 120 and performs an image display corresponding to the manipulation of the user finger or the pen.

The communication unit 151 includes a network connection or USB connection, an ultrasonic unit, an infrared communication unit, etc. and is an interface capable of communicating with devices outside of the device being manipulated 150.

The settings input unit 152 includes a button and a touch panel etc. and is an interface for receiving inputs from the user.

The control unit 153 includes a circuit board and software etc. and controls the communication unit 151, the setting input unit 152, the image projecting unit 154, the display unit 155, the light emitting unit 156, the sound output unit 157, and the electronic pen 170.

The image projecting unit 154 includes a light source lamp, a liquid crystal panel and lens, etc. and projects an image onto the image projection surface. Here, if the light that is projected from the image projecting unit 154 is light in a visible light range shorter than a specific wavelength, and the light that is emitted from the illuminating lights 103, 104 are lit in a non-visible range longer than a specific wavelength, the user can visually recognize only the light that is projected from the image projecting unit 154. A bandpass filter, etc. may also be utilized to control the wavelength of the light that is projected.

The display unit 155 includes a circuit board and a liquid crystal display, etc. and displays information such as letters and images. This is not only a display unit for displaying images that the image projecting unit 154 projects but also a display unit for displaying information separate from the image information.

The light emitting unit 156 includes a circuit board and light emitting elements, etc. and forms the lit, flashing, and unlit states, etc.

The sound output unit 157 includes a circuit board, an amplifier, and a speaker, etc. and output voice messages and sound effects, etc.

The electronic pen 170 includes a circuit board and light emitting elements, etc. The details of the electronic pen are subsequently described while referring to FIG. 5A to FIG. 5C.

The regions which are image-captured by the camera 102 or namely the regions that are illuminated by the illuminating lights 103, 104, signify the manipulation surface where the user manipulates the image projected by the image projecting unit 154 by using for example fingers or an electronic pen 170. On the manipulation screen, at least a portion of the image that the image projecting unit 154 projects is changed or the entire image is switched to another image according to the instructions from the user. A manipulation surface at least partially overlaps a portion of the image projection surface that is projected by the image projecting unit 154; and the user gives instructions by pointing for example by using fingers or the electronic pen 170 on a portion of the image that is projected by the image projecting unit 154.

The finger contact position detecting unit 105, the pen contact position detecting unit 106, unit for determining whether or not pen/finger can be utilized 107 as subsequently described are main structural elements for detecting the user manipulation and judging whether the finger, electronic pen 170 are usable or not. These three structural elements can collectively be called the manipulation detection judging unit. The device containing this manipulation detection judging unit, or the device containing the finger contact position detecting unit 105 and the pen contact position detecting unit 106 can be called the manipulation detection device.

Figure 4A:
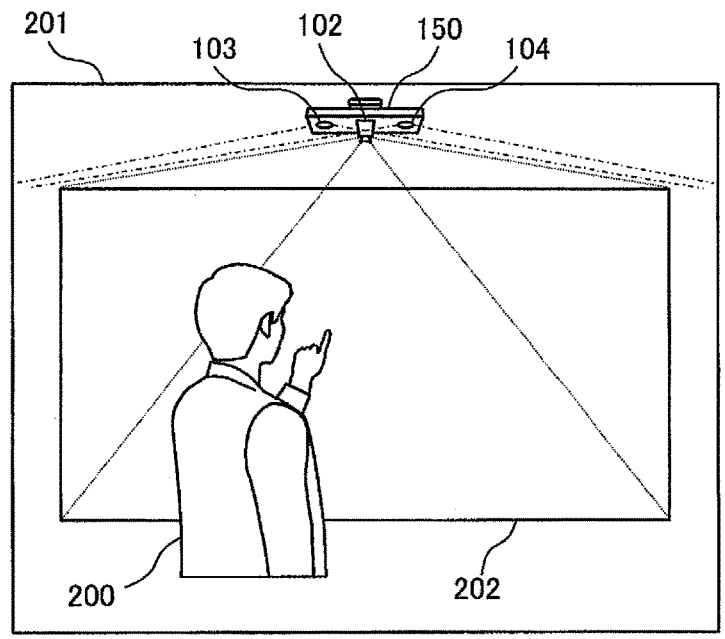
FIG. 4A is a drawing showing an overview of the manipulation detection device and an example of the state of the user manipulating with a finger.
Figure 4B:
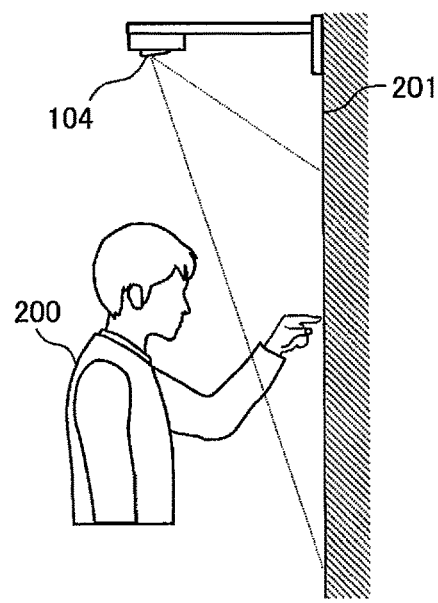
FIG. 4B is a drawing showing an overview of the manipulation detection device and an example of the state of the user manipulating the device with a finger.
Figure 4C:
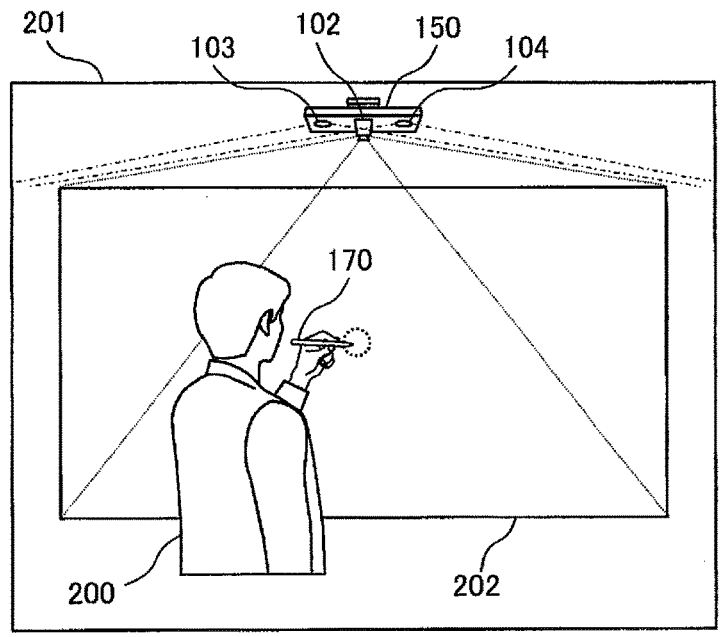
FIG. 4C is a drawing showing an overview of the manipulation detection device and an example of the state of the user manipulating the device with an electronic pen.
Figure 4D:
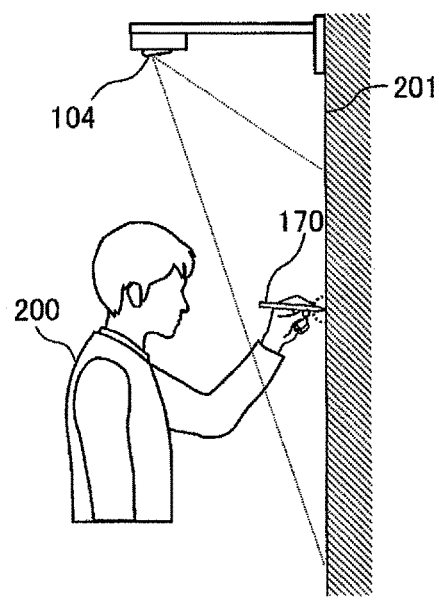
FIG. 4D is a drawing showing an overview of the manipulation detection device and an example of the state of the user manipulating the device with an electronic pen.

FIG. 4A to FIG. 4D show overviews and examples of states where the user 200 operates the manipulation detection device. In FIG. 4A and FIG. 4B the user 200 operates the manipulation detection device by finger and in FIG. 4C and FIG. 4D the user 200 operates the manipulation detection device by the electronic pen 170.

Figure 5A:
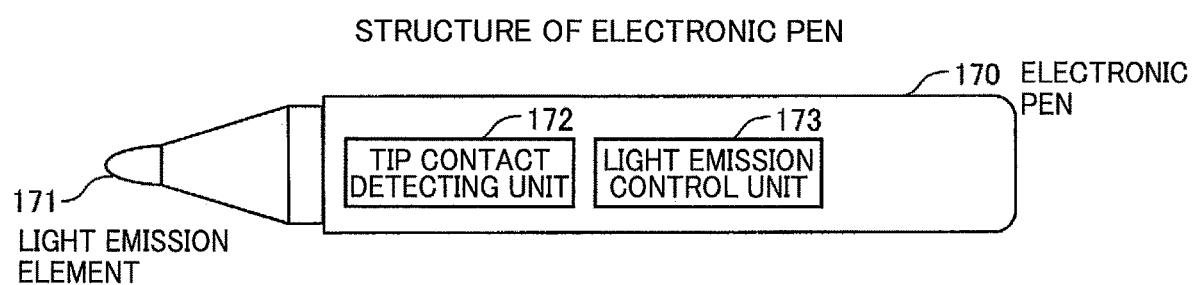
FIG. 5A is a drawing showing an example of the structure of the electronic pen.

FIG. 5A is a drawing showing an example of the structure of the electronic pen 170.

Figure 5B:
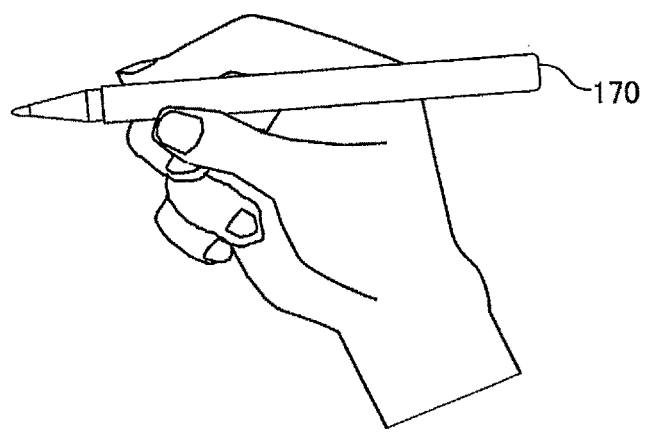
FIG. 5B is a drawing showing the state when the electronic pen tip is not making contact.

FIG. 5B and FIG. 5C are drawings showing an example of the state when the tip of the electronic pen is not in contact and when the tip is in contact.

In FIG. 5A, the reference numeral 170 denotes the electronic pen, 171 is the light emission element, 172 is the tip contact detecting unit, and 173 is the light emission control unit. The tip contact point detection unit 172 includes a circuit board and a decompression sensor and judges whether or not the tip of the electronic pen 170 is contacting the wall surface, etc. The light emission control unit 173 includes a circuit board and software, etc. and as shown in FIG. 5B, when the tip of the electronic pen 170 is not in contact, controls the light emission element 171 to turn off (unlit); and as shown in FIG. 5C, when the tip of the electronic pen 170 is in contact, controls the light emission element 171 to turn on (lit) based on the judgment results from the tip contact point detection unit 172. The light emission control unit 173 may alternatively execute control so that the light emission element 171 is in a different state during contact or non-contact such as by controlling the light emission element 171 to turn on when the tip of the electronic pen 170 is in contact, and flash when not in contact. Alternatively, the light emission control unit 173 may execute control so that the light emission element 171 flashes at a different frequency during contact or non-contact.

The user operates the manipulation surface by using fingers or the electronic pen 170. The manipulation section onto which the tip emits light and represented by the electronic pen 170 is called the first object being manipulated and the manipulation section onto which the tip does not emit light and represented by the fingers is called the second object being manipulated.

The camera 102 and the light emission element 171 are respectively an infrared camera and infrared illuminating light, and may perform processing to detect the pen contact position as subsequently described by capturing the infrared image. When configured by an infrared camera and infrared illuminating light, a filter may be added to the infrared camera to block out all or a portion of light not within the infrared region.

The method to detect the contact position between the wall surface and electronic pen is described next in FIG. 6A to FIG. 6C.

Figures 6A, 6B:
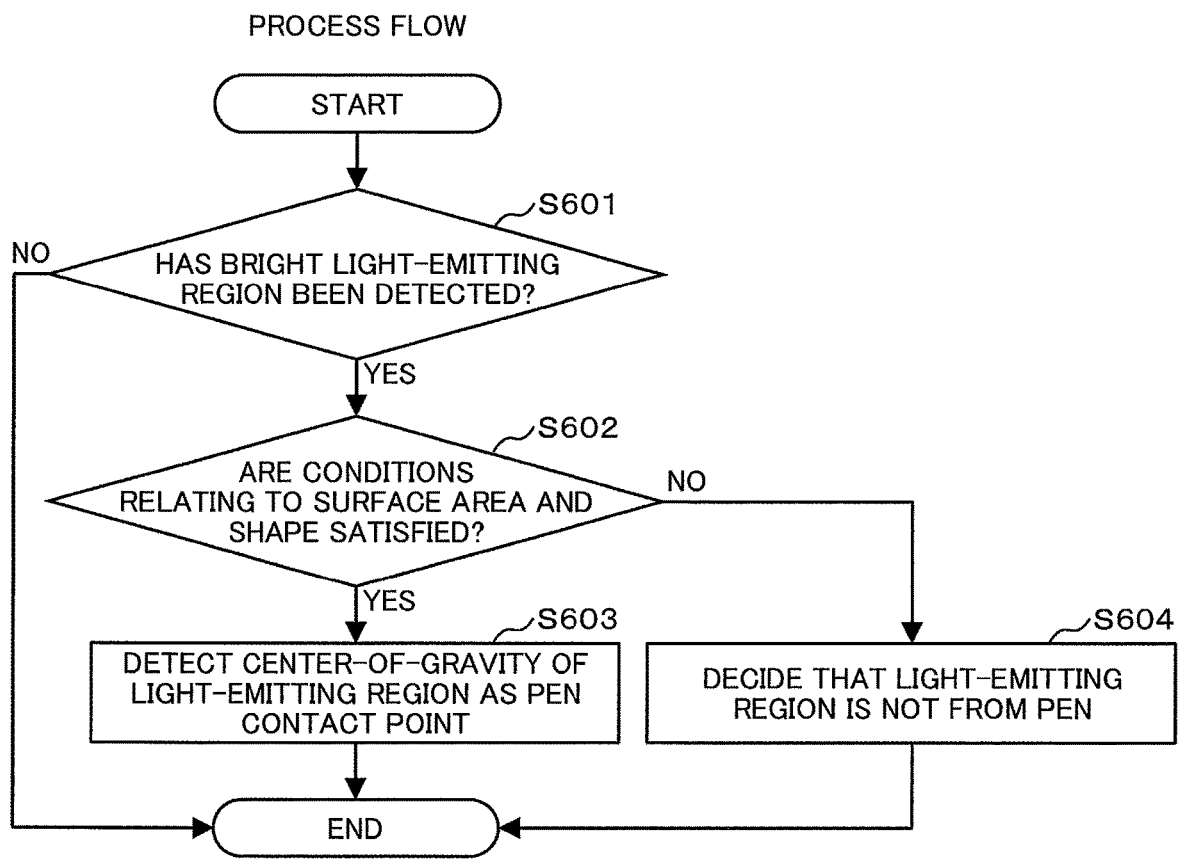
FIG. 6A is a drawing showing an example of the process flow for detecting the contact point of the electronic pen and the wall surface.
FIG. 6B is a drawing showing an example in detail of S602 in FIG. 6A.

FIG. 6A to FIG. 6C show an example of the process to detect the contact point of the electronic pen 170 and wall surface 201 by the pen contact position detecting unit 106.

FIG. 6A shows the process flow. The process flow that is shown in FIG. 6A is a one circuit process where the processes in S601 to S604 are executed one each. However, these processes are actually executed in consecutive, repeating flow in a process that returns to S601 after S603, S604.

First of all in S601, in the image that is captured by the camera 102, a judgment is made of whether or not a brightly lit region is detected by the pen contact position detecting unit 106. If the region is detected the process proceeds to S602, and if not detected the consecutive flow shown in FIG. 6A ends.

In S602, a judgment is made whether or not the light emitting region fulfills the specified conditions. Each of the conditions in S602 is set so that conditions are satisfied when the light emitting region is the cause for emitting light from the electronic pen 170; and conditions are not satisfied for all other causes.

FIG. 6B is a drawing showing an example of details for S602 in FIG. 6A.

FIG. 6C is a drawing showing an example of details for S602 and S603 in FIG. 6A.

As shown in FIG. 6B, confirmation is made on whether or not the characteristics of surface area, circumference, longitudinal maximum length, lateral maximum length, and aspect ratio are within the upper limit value and lower limit value, and a judgment is made for example that the light emitting region 651 satisfies the conditions, and that the light emitting region 652 does not satisfy the conditions shown in FIG. 6C. If the judgment results are that conditions are satisfied, the process proceeds to S603, and if conditions are not satisfied the process proceeds to S604.

In S603, the center-of-gravity 650 of the light emitting region 651 is detected as the pen contact point. Alternatively, the center-of-gravity position for the point group along the circumference of the light emitting region 651 may also be detected as the contact point for the pen tip. The consecutive flow that is shown in FIG. 6A ends when the process of S603 is complete.

In S604, a judgment is made that the light emitting region is not from the pen. The consecutive flow shown in FIG. 6A ends when the process of S604 is complete.

A supplemental description for the operation in S602 is given here. If the coordinate detection device 101 is only detecting the contact position of the electronic pen 170, the illuminating lights 103, 104 are not required, however in the present example the illuminating lights are utilized for also detecting the finger contact position. As a result, when the illuminating light is emitted onto an object such as metal having high reflectivity, a region that brightly emits light is image-captured by the camera 102 as shown in 652 in FIG. 6C. S602 could be omitted if the light emitting piece is only the light emission element 171 of the electronic pen 170 however, when an object other than the pen tip is brightly emitting light then a process to confirm that each condition is fulfilled is performed in order to prevent mistakenly detecting the pen contact position. That is, S602 is effectively applied for avoiding mistaken detection.

Other image processing algorithms for obtaining the same result may be utilized for the process in the pen contact position detecting unit 106.

FIG. 7A to FIG. 7D are drawings showing an example of differences in shadow shapes due to contact or not between the finger 400 and the wall surface 201.

When the finger 400 is not in contact with the wall surface 201 as shown in FIG. 7A, a shadow 401 projected by the illuminating light 104, and a shadow 402 projected by the illuminating light 103 can be formed, and the shadow 401 and shadow 402 are in respectively separate states. FIG. 7B illustrates the principle by which the shadows as shown in FIG. 7A are formed. Viewing from the direction from the tip of the finger, the light that illuminating light 104 emits is blocked by the finger 400, and a shadow 401 can form on the wall surface 201. Also, the light that illuminating light 103 emits is blocked by the finger 400, and a shadow 402 can form on the wall surface 201. Therefore, the shadow 401 and the shadow 402 will each be separate states in the image that the camera 101 captures.

Figure 7D:
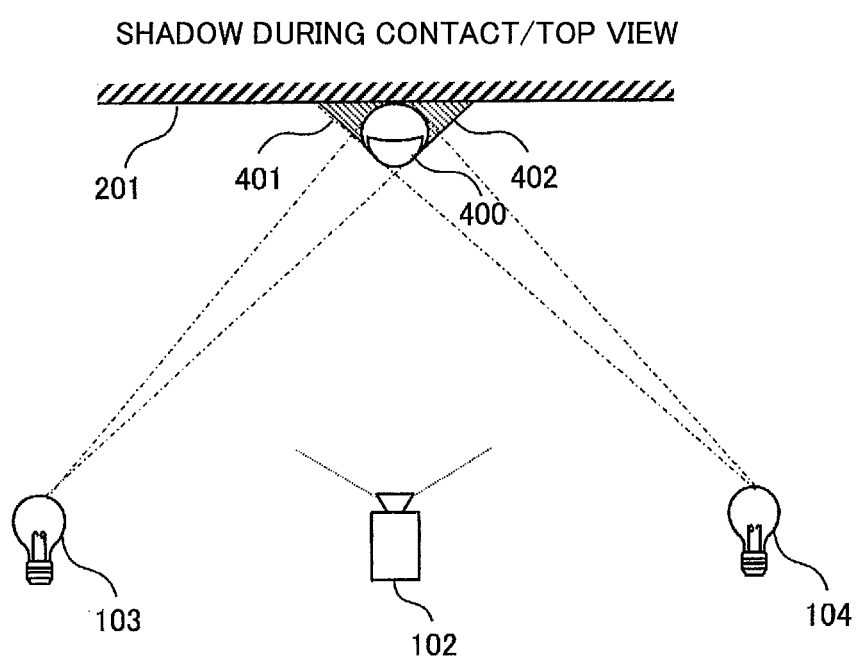
FIG. 7D is a top view showing an example of the shape of the shadow when the finger and the wall surface are in contact.

As shown in FIG. 7C on the other hand, when the tip of the finger 400 is in contact with the wall surface 201, the shadow 401 and shadow 402 are in a state in proximity with the tip of finger 400. In FIG. 7D, the principle for forming the shadow as shown in FIG. 7C is described. Viewing from the direction from the tip of the finger, the light that the illuminating light 104 emits is blocked by the finger 400 and a shadow 401 is formed on the wall surface 201. Also, the light that the illuminating light 103 emits is blocked by the finger 400, and a shadow 402 is formed on the wall surface 201. The shadow 401 and shadow 402 are therefore in proximity to the fingertip position in the image that the camera 102 captures.

The method for detecting the contact position between the finger and wall surface is described next in FIG. 8A to FIG. 9B.

FIG. 8A to FIG. 8E are drawings showing an example of the difference in shapes of the shadow due to the distance between the finger 400 and the wall surface 201.

FIG. 8A shows the state of the change in the shadow due to the distance between the finger 400 and the wall surface 201. However, when at the closes distance between the finger 400 and the wall surface 201, the shadow 401 and the shadow 402 are in a state in proximity to the fingertip position. When the finger 400 separates from the wall surface 201 the distance between the shadow 401 and the shadow 402 gradually increases. When the distance between the finger 400 and the wall surface 201 is greatest, the shadow 401 and shadow 402 are in respectively separate states. The distance between the shadow 401 and shadow 402 in this way gradually increase as the finger 400 separates from the wall surface 201.

Figure 8B:
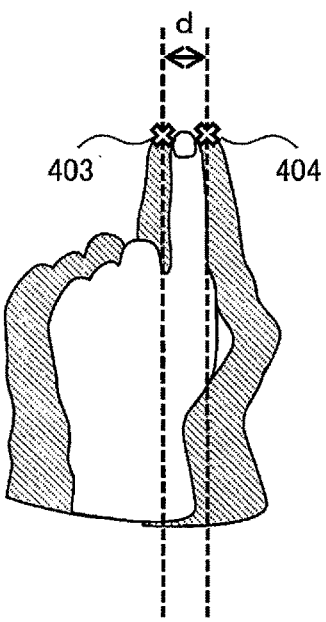
FIG. 8B is a drawing showing one example of the relation between the characteristic point and the distance of shadows.
Figure 8C:
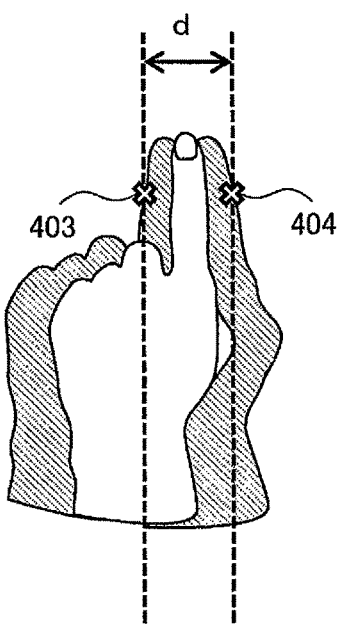
FIG. 8C is a drawing showing one example of the relation between the characteristic point and the distance of shadows.
Figure 8D:
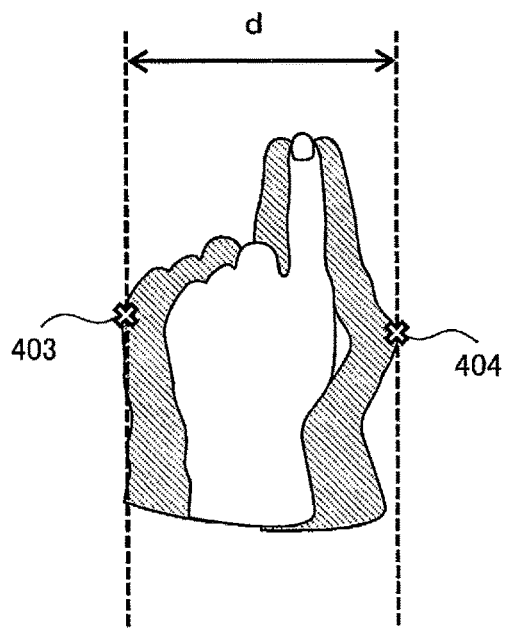
FIG. 8D is a drawing showing one example of the relation between the characteristic point and the distance of shadows.
Figure 8E:
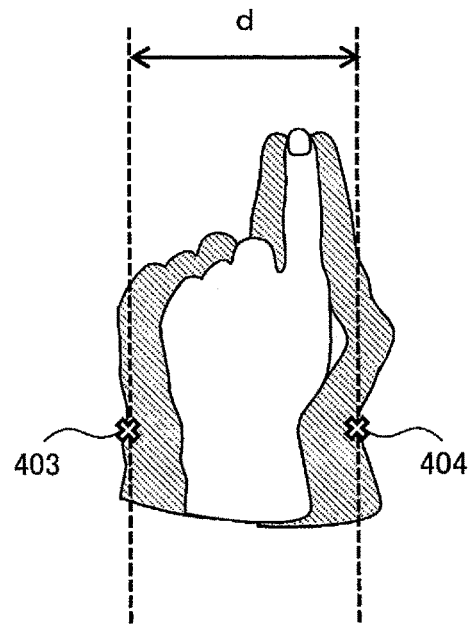
FIG. 8E is a drawing showing one example of the relation between the characteristic point and the distance of shadows.

FIG. 8B to FIG. 8E illustrates the method for defining and substituting the distance between the shadow 401 and shadow 402 into the distance between the two characteristic points. For example, the characteristic points 403 and 404 are respectively set at the tip of each shadow as shown in FIG. 8B, and the distance d between the characteristic points can define the distance between the shadow 401 and shadow 402. Alternatively, the characteristic points 403 and 404 can each be set on the outer side of the section equivalent to each shadow of the finger as shown in FIG. 8C, and the distance d between the characteristic points can define the distance between shadow 401 and shadow 402. Alternatively, the characteristic points 403 and 404 can each be set at a section at a position on the outermost side of each shadow as shown in FIG. 8D, and the distance d between the characteristic points defined as the distance between the shadow 401 and shadow 402. Or, the characteristic points 403 and 404 can each be set on the outer side at a section equivalent to the wrist of each shadow as shown in FIG. 8E, and the distance d between the characteristic points defined as the distance between the shadow 401 and shadow 402.

Figure 9A:
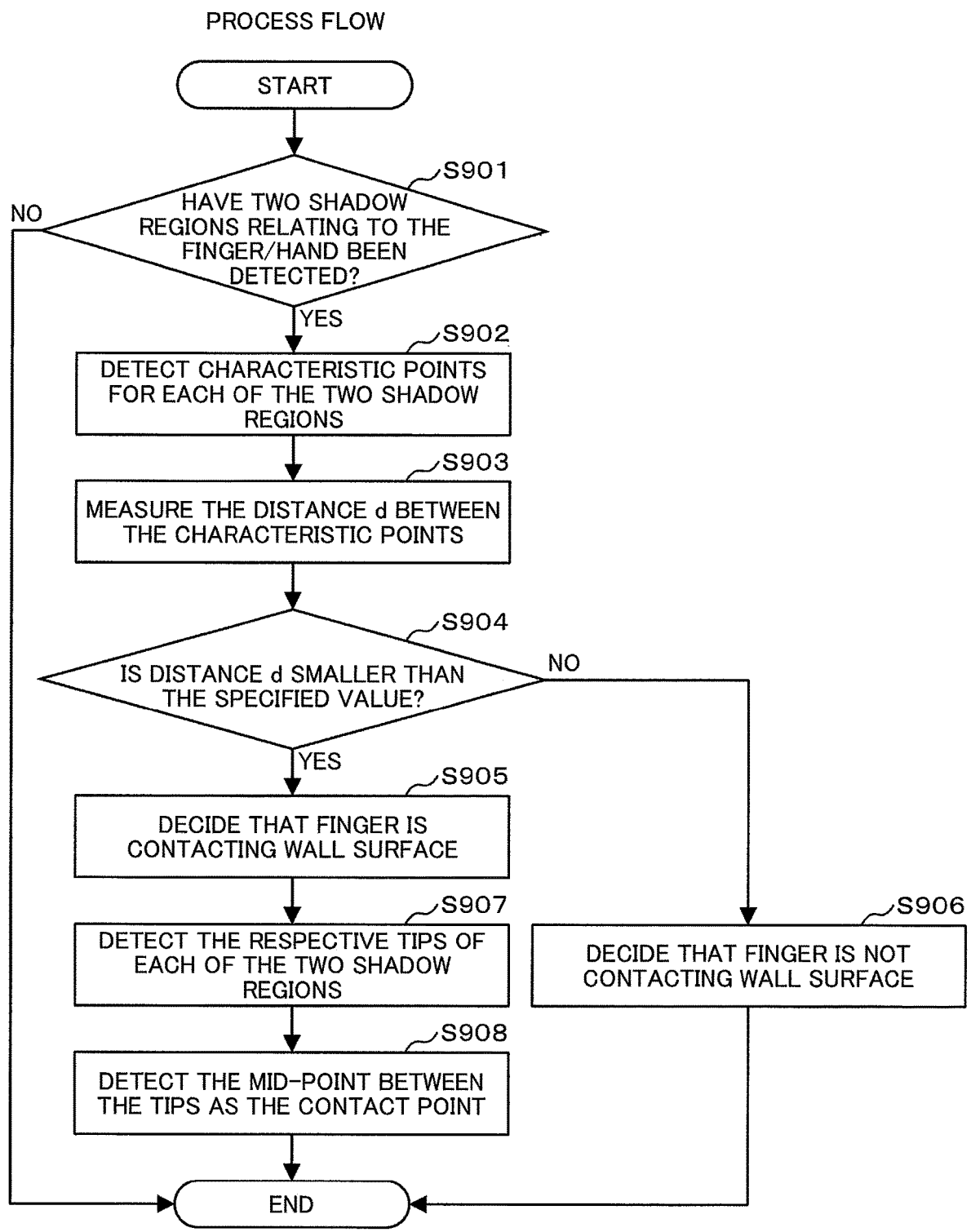
FIG. 9A is a drawing showing an example of the process flow for detecting the contact point of the finger and the wall surface.
Figure 9B:
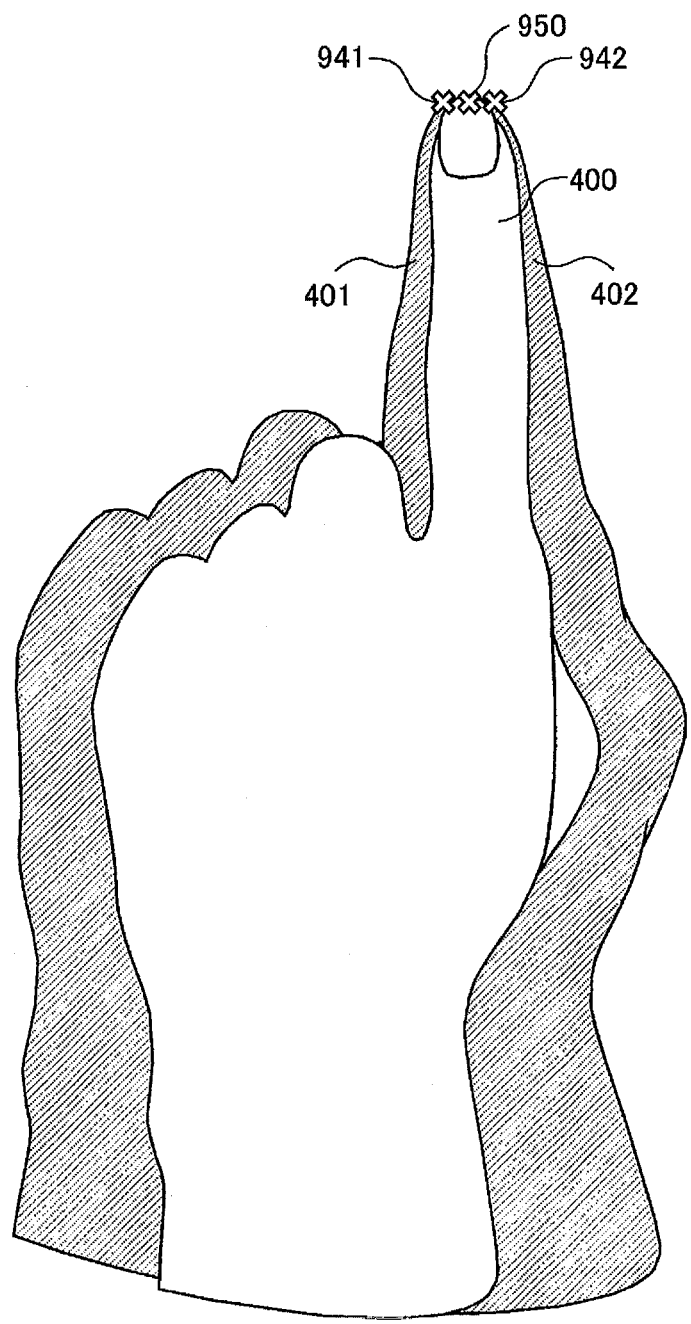
FIG. 9B is a drawing showing an example in detail of S908 in FIG. 9A.

FIG. 9A and FIG. 9B show an example of the process to detect the contact point of the finger 400 and the wall surface 201 by the finger contact position detecting unit 105.

FIG. 9A shows the process flow. The process flow that is shown in FIG. 9A is a one circuit process where the processes in S901 to S908 are executed one each. However, these processes are actually executed in a consecutive, repeating flow in a process that returns to S901 after S906, S908. First of all in S901, in the image that is captured by the camera 102, a judgment is made of whether or not two shadows relating to the finger and hand are detected. If the shadows are detected the process proceeds to S902, and if not detected the consecutive flow shown in FIG. 9A ends.

In S902, the respective characteristic point 403 and characteristic point 404 are each detected for the two shadows relating to the finger and hand. The process proceeds to S903 when the processing in S902 ends.

In S903, the distance d between the characteristic point 403 and characteristic point 404 is measured. The process proceeds to S904 when the processing in S903 ends.

In S904, a judgement is made whether or not the distance d between the characteristic point 403 and characteristic point 404 is smaller than a specified value. If smaller than a specified value the process proceeds to S905, and if larger than a specified value the process proceeds to S906.

In S905, a judgment is made that the finger 400 is contacting the wall surface 201. The process proceeds to S907 when the process in S905 ends.

In S906, judgment is made that the finger 400 is not contacting the wall surface 201. The consecutive flow that is shown in FIG. 9A ends when the process in S906 ends.

In S907, the tip 941 and the tip 942 are each detected for two shadows relating to the finger and hand as shown in FIG. 9B. The process proceeds to S908 when the process in S907 ends.

FIG. 9B is a drawing showing an example of the details for S908 in FIG. 9A.

In S908, the mid-point 950 of the tip 941 and tip 942 is detected as the contact point between the finger 400 and the wall surface 201 as shown in FIG. 9B. The consecutive flow that is shown in FIG. 9A ends when the process in S908 ends.

Other image processing algorithms for obtaining the same effect may be utilized for the process in the finger contact position detecting unit 105.

When detecting the contact point in the process procedures that are shown in FIG. 9A and FIG. 9B, the contact point is not detected for example when a section of the user's palm, a bent finger joint, or a section other than the tip of the finger mistakenly makes contact with the wall surface 201, or a portion of the hand gripping the electronic pen makes contact with the wall surface 201. In this way, when a section other than the tip of the finger contacts the wall surface 201, a judgment is made that contact is made without the user's intent, so that this example renders the effect of avoiding detection of the contact point.

Comparing the above method when using the electronic pen 170 in S602 to S604 in FIG. 6A with the method when using the finger in S904 to S908 in FIG. 9A for deciding the position that the user points to, clearly shows that both methods are completely different. Therefore as shown in FIG. 1, one feature of the present embodiment is that the coordinate detection device 101 includes both the finger contact position detecting unit 105 and the pen contact position detecting unit 106.

Figure 10A:
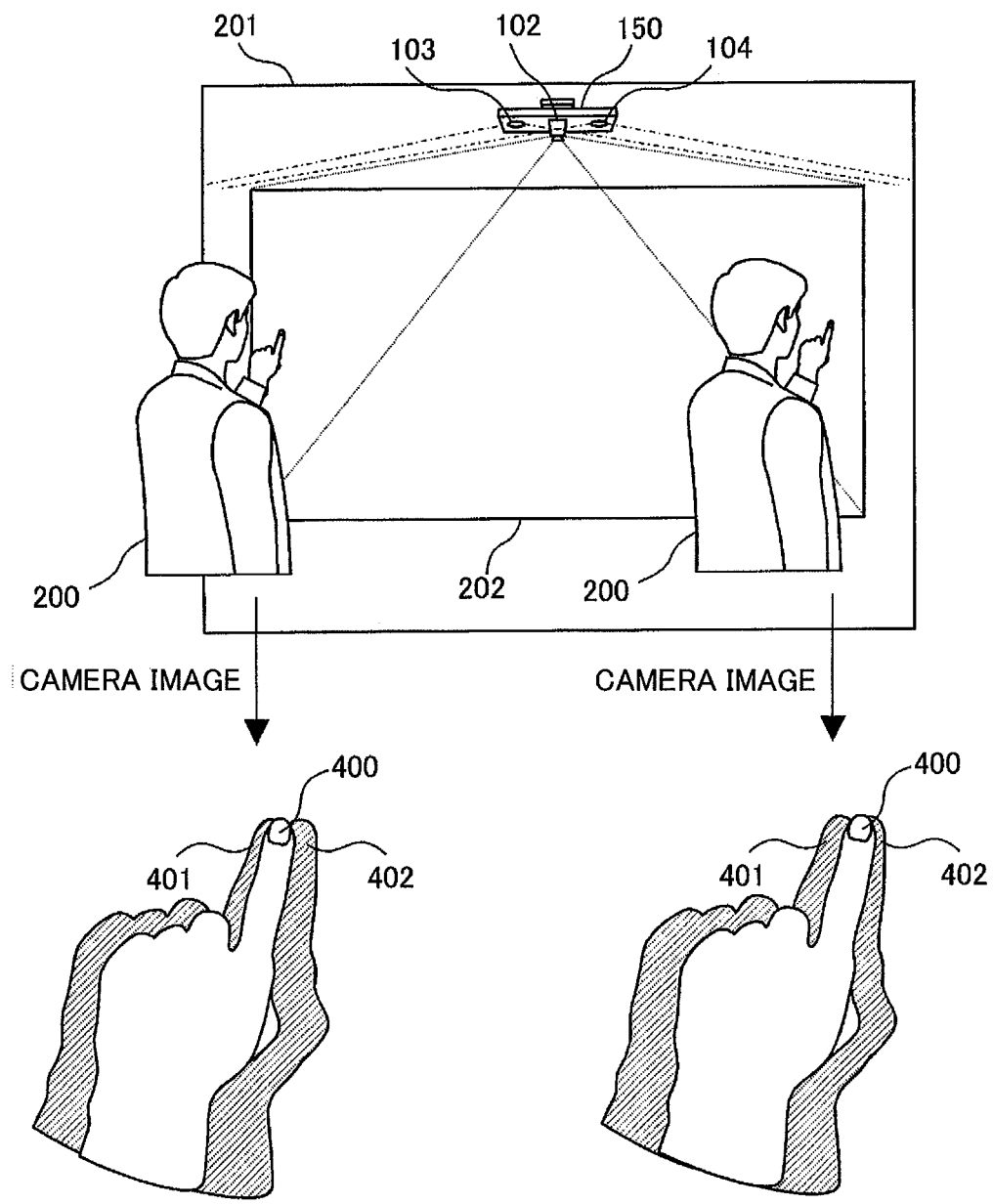
FIG. 10A is a drawing showing an example of the state of the operation from a different manipulation position.
Figure 10B:
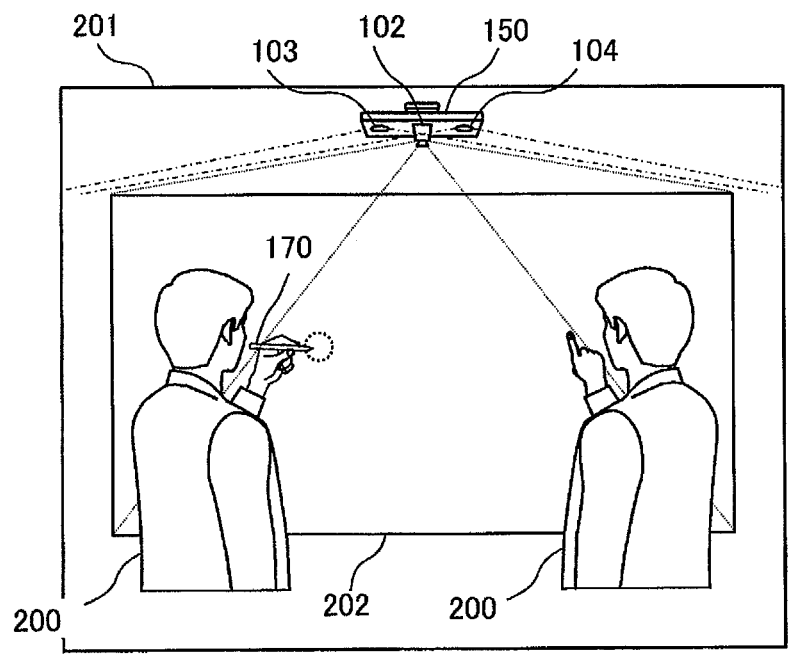
FIG. 10B is a drawing showing an example of the operation state due to a different object being manipulated.

FIG. 10A and FIG. 10B are drawings showing examples of the state where operating from different manipulating positions and where operating with different objects being manipulated.

FIG. 10A is a drawing showing the difference in shadow shapes due to the user's manipulation position. There is no change in the positional relation of the camera 102, and the illuminating lights 103, 104 even if the manipulation position of the user 200 deviates from the center of the wall surface 201, or deviates from the range between the illuminating lights 103, 104. For that reason, in the captured image of camera 102, the state where the finger 400 is in the center of the image, and the shadows 401, 402 can be maintained on both sides is shown in the figure. Therefore, even if the user's manipulation position deviates from the center of the wall surface 201, the shadows 401, 402 can be detected, and the detection methods and control methods that are described in FIG. 7A to FIG. 9B can all be applied in the same way.

FIG. 10B shows the state of operation by the finger 400 and the electronic pen 171 that are two different objects being manipulated. The finger contact position detecting unit 105 and the pen contact position detecting unit 106 are mutually separate in the coordinate detecting device 101 and if both are operated in parallel, the finger and pen contact positions can be detected at the same time. Moreover, the contact point coordinates for the pen and the contact point coordinates for the finger are differentiated from each other during detection so that when the electronic pen is in contact and when the finger is in contact, different operations and display states can be achieved.

In the above described Example 1, the electronic pen contact position coordinates and the finger contact position coordinates are detected and output to the device being manipulated as the detection result data by utilizing one camera and two illuminating lights. The present example is therefore capable of correctly detecting the electronic pen and finger contact positions on the manipulation surface without installing touch sensors on the manipulation surface. The example therefore renders the effect that user operability of the device being manipulated is improved.

Example 2

In Example 2, a method is described for notifying the user of the state when the finger contact position cannot be detected on the device being manipulated.

FIG. 11 is a drawing showing an example of the state where illuminating the wall surface with light from an external source.

The reference numeral 1101 denotes a light (external light) from an outside source such as a fluorescent lamp, incandescent lamp or solar light, and is a light source different from the aforementioned illuminating lights 103, 104. When this type of external light 1101 is intensely emitted onto the wall surface 201, the shape of the shadows 401, 402 collapse or become faint, and the contrast between light and dark with the periphery becomes small, etc. Due to these circumstances, phenomena occur such as that the camera 102 cannot accurately capture the shape, or the finger contact position detecting unit 105 cannot accurately detect the contact positions of the finger 400 and the wall surface 201. In the electronic pen 170 on the other hand, the light emission element 171 generates its own light and so is not easily susceptible to effects from the external light 1101, and the pen contact position detecting unit 106 can accurately detect the contact position of the electronic pen 170 and wall surface 201 even in an environment where external light is being illuminated.

By notifying the user of this type of state where only operation by the electronic pen 170 is possible and user operation by the finger 400 cannot be utilized, the operability of the device being manipulated is improved. Details of the notification method are subsequently described while referring to FIG. 12A and FIG. 12B. Also, by controlling the lighting state of the illuminating lights 103, 104 with specialized operation of the electronic pen 170, detection of the contact position of the electronic pen 170 can be achieved in a more stable state under an environment where external light 1101 is illuminated. Details of the method for controlling the lighting state are subsequently described while referring to FIG. 16A and FIG. 16B.

The unit for determining whether or not pen/finger can be used 107 judges whether or not the operation by finger is usable. In a state for example where only the illuminating lights 103, 104 are lit and the external light 1101 is not illuminating at all, the brightness at which the camera 102 captures image is retained as pre-stored data. Afterwards, if the image brightness at which images are currently being captured is a fixed amount or larger than the data being retained, the quantity of external light 1101 is judged as large. A judgement can consequently be made that finger operation is not possible. Or the illuminating lights 103, 104 temporarily turn off or namely images are captured in a state where only the external light 1101 is being illuminated, and if the image brightness at that time is larger than a specified value, a judgement is made that the quantity of external light 1101 is large and the operation by finger is not possible. The judgement results are reflected in the information indicating whether or not pen/finger can be used in the detection result data 120 and output from the communication unit 108 to the device being manipulated 150.

Figure 12A:
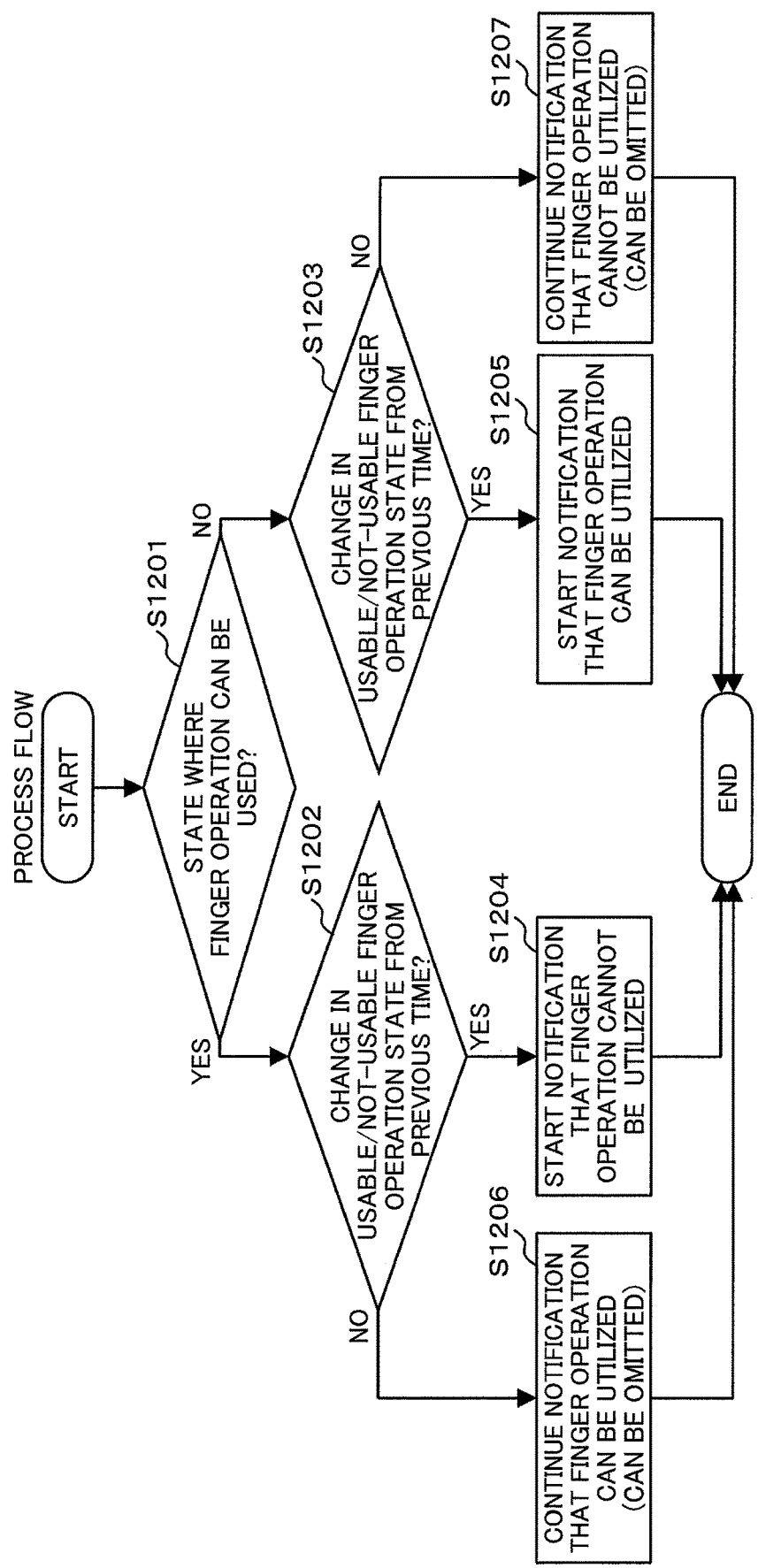
FIG. 12A is a drawing showing an example of the process flow for notification about whether or not operation by finger can be utilized.
Figure 12B:
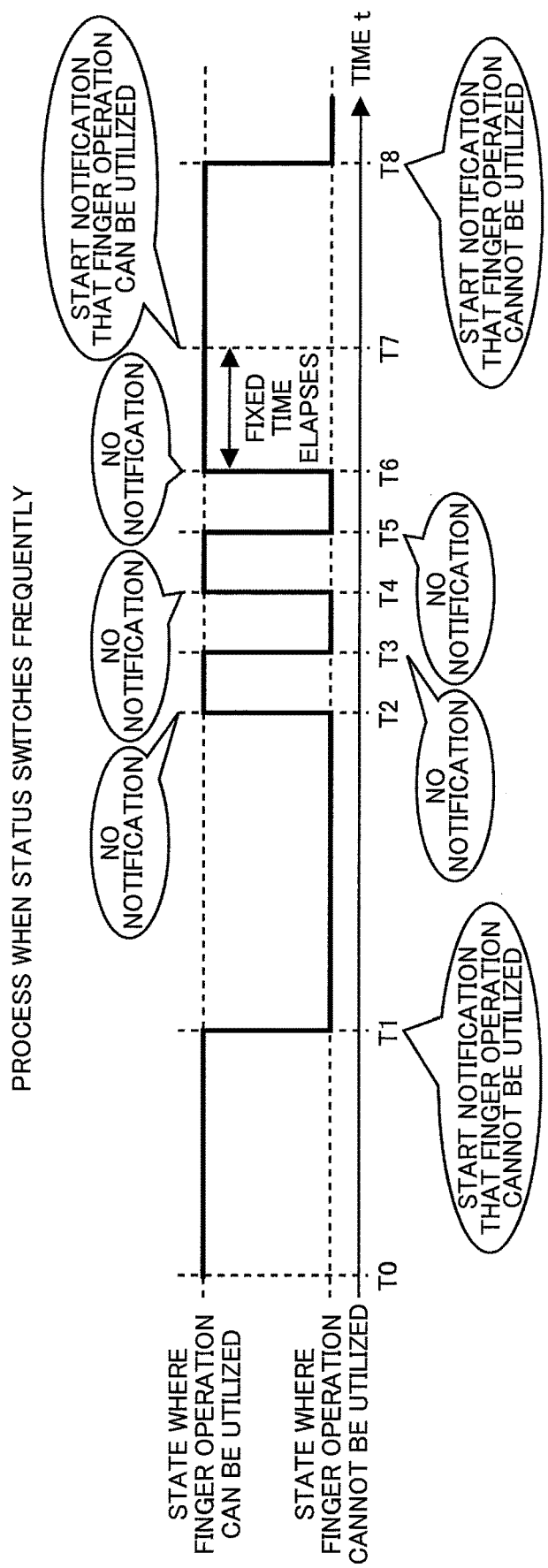
FIG. 12B is a drawing showing an example of the process when there is frequent switching of the state in FIG. 12.

FIG. 12A and FIG. 12B are drawings showing the process for notifying if operation by finger is usable or not.

FIG. 12A shows the process flow. The process flow that is shown in FIG. 12A is a one circuit (process) flow where the processes in S1201 to S1207 are executed one each. However, these processes are actually executed in a consecutive, repeating flow in a process that returns to S1201 after S1204, S1205, S1206, and S1207. First of all in S1201, the unit for determining whether or not pen/finger can be used 107, judges whether the state allows use of finger operation and for example decides to use the above described method. If usable, the process proceeds to S1202, and if not usable the process proceeds to S1203.

In S1202, a judgment is made on whether or not there is a change in the finger operation usable/unusable state from the previous time. That is, a judgement is made on whether or not there is a change in the current judgment results relative to the results judged in S1201. If there is a change or namely a state where finger operation is usable has changed to a state where finger operation is not usable, the process proceeds to S1204. If there is no change, or namely, finger operation is currently usable, the process proceeds to S1206.

In S1203, a judgement is made on whether or not there is a change in the finger operation usable/unusable state from the previous time. That is, a judgement is made on whether or not there is a change in the current judgement results relative to the results judged in S1201. If there is a change or namely a shift is made from a state where finger operation cannot be used to a state where finger operation can be used, the process proceeds to S1205. If there is no changes, or namely if the finger operation cannot even currently be used, the process proceeds to S1207.

In S1204, notification that finger operation is not usable starts, and when this process ends, the consecutive flow shown in FIG. 12A ends.

In S1205, notification that finger operation is usable starts, and when this process ends, the consecutive flow shown in FIG. 12A ends.

In S1206, the notification that finger operation is usable continues. However, when this process is omitted and there is no change in the usable-not usable state then the same notification need not be continuously given to the user. When the process in S1206 ends, the consecutive flow shown in FIG. 12A ends.

In S1207, the notification that finger operation is not usable continues. However, when this process is omitted and there is no change in the usable-not usable state then the same notification need not be continuously given to the user. When the process in S1207 ends, the consecutive flow that is shown in FIG. 12A ends.

When the state is judged as unusable for finger operation in S1201, the finger contact position detecting unit 105 may stop the process for detecting the finger contact positon. The processing load on the finger contact position detecting unit 105 can in this way be reduced and that portion of the processing capacity can be expended on the pen contact position detecting unit 106 rendering the effect that the processing speed in detecting the pen contact position is improved. Alternatively, the communication unit 108 may be controlled so as not to output the finger contact point coordinates. In this way, the effect can be rendered that contact point coordinates for a finger with low detection accuracy in a state where the shape of the shadows 401, 402 collapses can be prevented from being output to the device being manipulated 150.

When executing the processing according to the process flow shown in FIG. 12A, notification of the frequently switching finger operation usable or non-usable state is given each time switching occurs. However, giving frequent notifications might prove bothersome to the user. To alleviate this condition, notification of a usable state can be given after a specified amount of time or longer elapses after switching from a finger operation unusable state to a usable state as shown in FIG. 12B.

FIG. 12B is a drawing showing an example of the process during frequent switching of the states in FIG. 12A. In FIG. 12B, the state switches from a finger operation usable state to finger operation unusable state at time t=T1, T3, T5, T8; and the state switches from a finger operation unusable state to a finger operation usable state at time t=T2, T4, T6. In this case, a notification is not made each time the state switches and for example the following processing is performed.

At t=T2, T4, T6, the fixed or longer period of time does not elapse after changing the state where finger operation is usable, and the state might possibly shift again to a state where not usable in the short time so no notification is given. The fixed period is set as the time between t=T7 and t=T6 in the drawing. At t=T7, after shifting the state to a state where finger operation is usable in t=T6, the elapsing a fixed period of time or more is confirmed so notification that finger operation is usable starts. At t=T1, T8, notification that finger operation is unusable starts simultaneous with switching to a finger operation unusable state. At t=T3, T5, after notification that finger operation is unusable at t=T1, while still not notifying even once that operation is usable, the state again switches to an unusable state, so no notification is made.

FIG. 13A and FIG. 13B are drawings showing an example of the state where notifying by a projecting image that finger operation is unusable. That is, the light that the image projecting unit 154 projects here contains message information giving the notification. The notification may of course include both a first display state showing the finger operation is usable, and a second display state showing the finger operation is not usable.

A state where finger operation is usable or not is notified for example by projecting a message from the image projecting unit 154 onto the wall surface 201 as shown for example in 1301, 1302 in FIG. 13A. Alternatively, notification may be given by projecting icons as shown in 1303, 1304 in FIG. 13B.

Figure 14A:
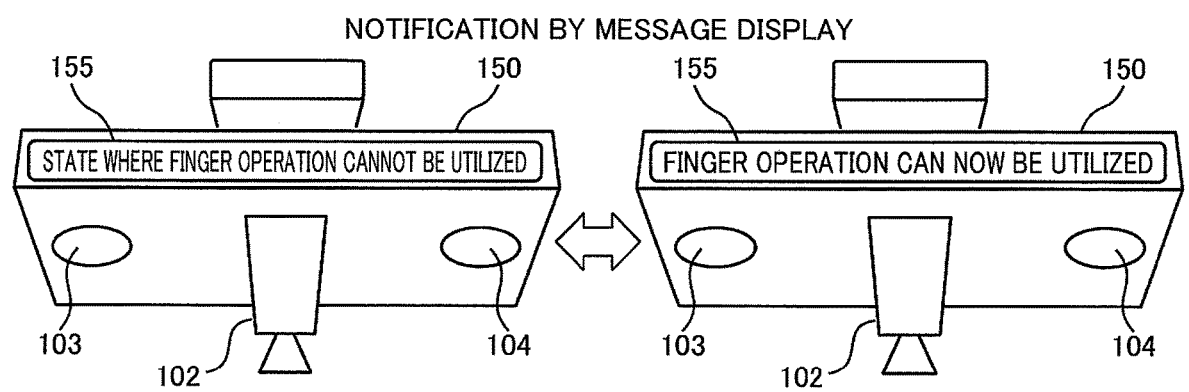
FIG. 14A is a drawing showing an example of the state for displaying a message indicating that operation by finger cannot be utilized.
Figure 14B:
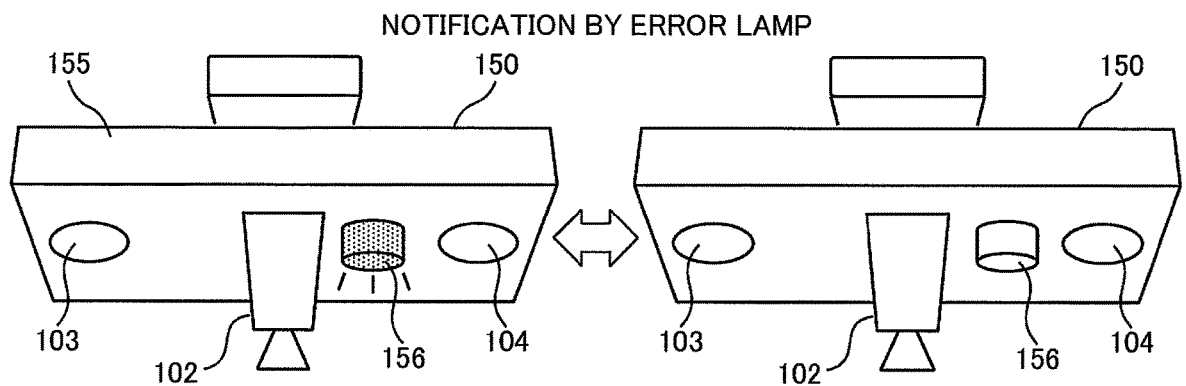
FIG. 14B is a drawing showing an example of the state for displaying a lamp indicating that operation by finger cannot be utilized.

FIG. 14A to FIG. 14C are drawings showing an example of the state to notify that finger operation is unusable by a method other than projecting images.

A finger operation usable or unusable state is notified for example by displaying a message on the display unit 155 as shown in FIG. 14A. Alternatively, notification may be made by switching an error lamp on and off via the light emitting unit 156 as shown in FIG. 14B. Or notification may be given by outputting voice message or a sound effect from the sound output unit 157 as is shown in FIG. 14C.

Alternatively, aside from the above methods, notification of a usable or non-usable state may be given by changing the pen state such as by emitting light of different colors from the light emitting element 171 during times when finger operation can utilized and cannot be utilized, by controlling the electronic pen 170 from the control unit 153.

FIG. 15 is a drawing showing an example of the setup menu that is provided to the user.

The setup menu is an interface allowing the user to make settings for notifications when finger operation cannot be used. The settings input unit 152 starts the setup menu, and the setup menu is projected onto the wall surface 201 by the image projecting unit 154 or displayed on the display unit 155. Providing the setup menu interface renders the effect that the settings for notification can be made to match user's preferences when finger operation is unusable.

On the setup menu, the user can select whether or not to give notification when finger operation is unusable. When selecting to give notification, the user can select by what method to give notification including message display, icon display, display by voice, and display by error lamp.

In FIG. 12A to FIG. 15, the case is described where the manipulation detection device can detect the contact point of the electronic pen 170 but detection of the finger contact point is not possible. Conversely however, when for example the remaining power level in the electronic pen 170 has decreased, the contact point for the electronic pen becomes undetectable and finger operation can be detected. In these types of cases, notification that operation by electronic pen is unusable may also be given in the same way. The unit for determining whether or not pen/finger can be utilized 107 can for example detect a drop in the power level of the battery for the electronic pen 170 by detecting a drop in brightness of the light-emitting region 651 or a decrease in the surface area.

Therefore, one feature of the present embodiment as shown in FIG. 1 is that the coordinate detecting device 101 includes a finger contact position detecting unit 105 and a unit for determining whether or not pen/finger can be utilized 107.

In an environment as described above where light (external light) is illuminated from an external source, in the present example, a judgment is made whether finger operation is usable or not based on the image that is captured by the camera. Notification can be given to the user when judged as a state where finger operation is unusable. The present example in this way renders the effect that the user can know the state of the device being manipulated, and the device being manipulated provides improved operability for the user.

Example 3

In Example 3, a method is described for changing the illumination lighting state when the finger contact point cannot be detected by the manipulation detection device.

As is previously described in FIG. 11, when the light from an external source (external light) such as a fluorescent lamp, incandescent lamp, or solar light is illuminated intensely, a state occurs where only operation by the electronic pen 170 is usable and operation by the finger 400 is unusable. Under this type of environment where external light is illuminated, controlling the lighting state of the illuminating lights 103, 104 by specialized operation of the electronic pen 170 allows more stably detecting the contact position of the electronic pen 170. Specialized operation of the electronic pen 170 for example signifies a state where the illuminating lights 103, 104 are turned off or dim. When the light intensity that is illuminated from the illuminating lights 103, 104 becomes weaker or disappears, and when the electronic pen 170 is in contact with the wall surface 201, the difference in contrast between the light emission element 171 and the periphery becomes large so that the light-emitting region 651 can be more accurately detected by the pen contact position detecting unit 106. The contact position of the electronic pen 170 can therefore be more stably detected.

Figure 16A:
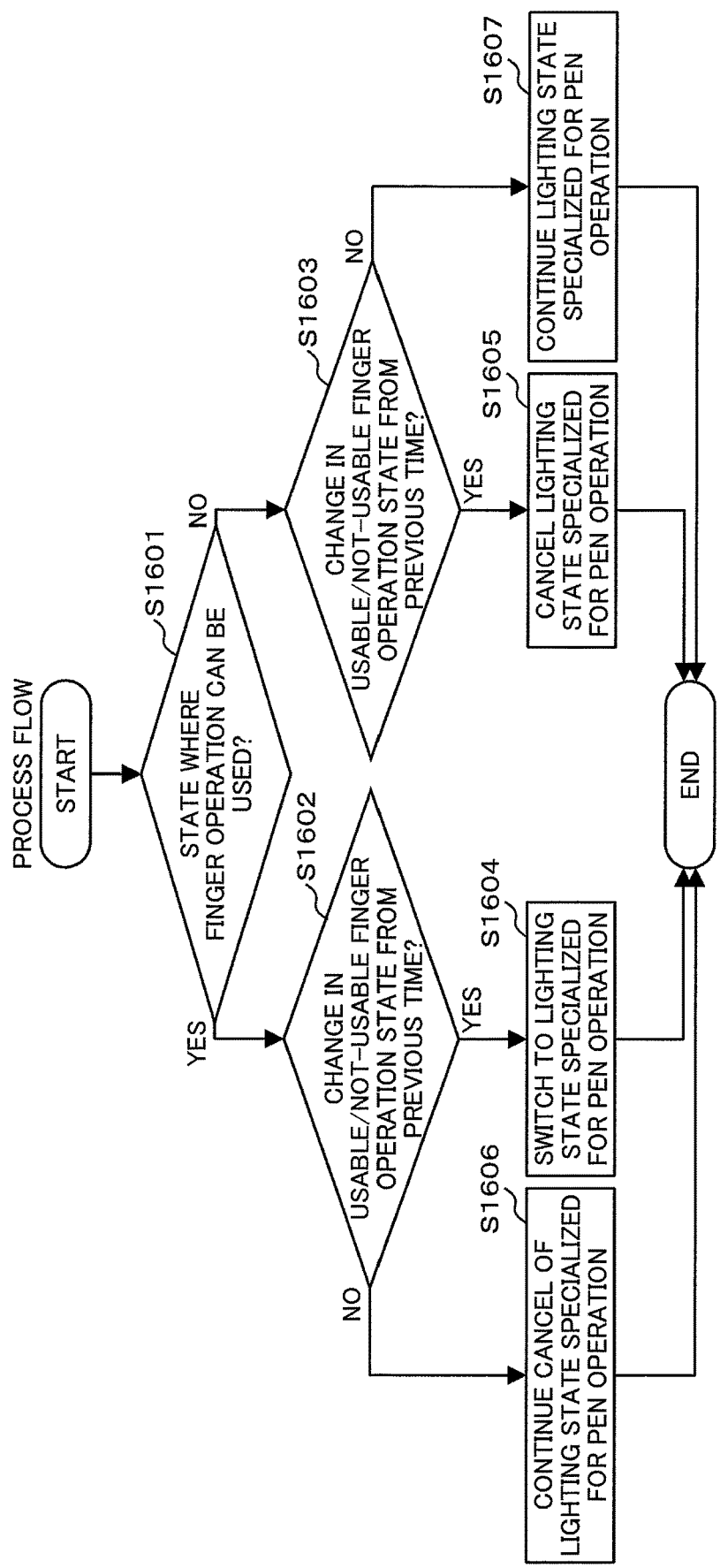
FIG. 16A is a drawing showing an example of the process flow when switching the lighting state of the illuminating light.

FIG. 16A and FIG. 16B are drawings showing an example of the process for switching the lighting state of the illuminating light corresponding to whether the finger operation is usable or non-usable.

FIG. 16A shows the process flow. The process flow shown in FIG. 16A is a one circuit process where the processes in S1601 to S1607 are executed one each. However, these processes are actually executed in consecutive, repeating flow in a process that returns to S1601 after S1604, S1605, S1606, and S1607. First of all in S1601, the unit for determining whether or not pen/finger can be used 107, judges whether or not the state allows use of finger operation. If usable, the process proceeds to S1602, and if not usable the process proceeds to S1603.

In S1602, a judgment is made on whether or not there is a change in the finger operation usable/unusable state from the previous time. That is, a judgment is made on whether or not there is a change in the current judgment results relative to the results judged in S1601. If there is a change or namely a state where finger operation is usable has changed to a state where finger operation is not usable, the process proceeds to S1604. If there is no change, or namely finger operation is currently usable, the process proceeds to S1606.

In S1603, a judgment is made on whether or not there is a change in the finger operation usable/unusable state from the previous time. That is, a judgment is made on whether or not there is a change in the current judgment results relative to the results judged in S1601. If there is a change or namely a shift is made from a state where finger operation cannot be used to a state where finger operation can be used, the process proceeds to S1605. If there is no change, or namely if finger operation cannot even currently be used, the process proceeds to S1607.

In S1604, the process switches to lighting state specialized for pen operation, namely the illuminating lights 103, 104 are turned off or dim, and when this process ends the consecutive flow that is shown in FIG. 16A ends.

In S1605, the lighting state specialized for pen operation is cancelled, namely the illuminating lights 103, 104 return to normal brightness, and when this process ends the consecutive flow that is shown in FIG. 16A ends.

In S1606, the cancellation of the lighting state specialized for pen operation continues, and when this process ends the consecutive flow that is shown in FIG. 16A ends.

In 1607, the lighting state specialized for pen operation continues and when this process ends the consecutive flow that is shown in FIG. 16A ends.

When executing processing according to the process flow shown in FIG. 16A, the illumination lighting state of the illumination switches each time even in cases when finger operation is frequently switching to usable or non-usable state. In FIG. 12B, after finger operation switches from non-usable state to usable state, the illumination lighting state may also be set to switch after a specified amount of time or more elapses in a state where finger operation is usable; in the same way that notification is given after a fixed period of time or more elapses in the usable state.

FIG. 16B is a drawing showing an example of the process during frequent switching of the states in FIG. 16A. In FIG. 16B, the switching to a finger operation usable or non-usable state is at the same timing as the timing shown in FIG. 12B. In this case, the process for illumination lighting state switching is for example as shown below.

At t=T2, T4, T6, the fixed or longer period of time does not elapse after changing the state where finger operation is usable, and the state might possibly shift again to a state where not usable in the short time so no switching of the lighting state is performed. The fixed period is set as the time between t=T7 and t=T6 in the drawing. At t=T7, after shifting the state to a state where finger operation is usable in t=T6, the elapsing a fixed period of time or more can be confirmed so a lighting state specialized for pen operation is canceled. At t=T1, T8, a switch to a lighting state specialized for pen operation is made simultaneous with switching to a finger operation unusable state. At t=T3, T5, after switching to a lighting state specialized for pen operation at t=T1, a switch is made to a state where finger operation is unusable while not even a single change in the lighting state has yet been made, so no switching of the lighting state is performed.

In FIG. 16A and FIG. 16B, stable detection of the electronic pen contact point was achieved by controlling the lighting state of illuminating lights 103, 104, however controlling of the electronic pen 170 by the control unit 153 may be performed instead of that method or in parallel with that method. For example if the light emission intensity of the light emitting element 171 is intensified during the finger operation unusable state, the difference in contrast between the light emitting element 171 and the periphery becomes large during contact between the electronic pen 170 and the wall surface 201, so stable detection of the contact position of the electronic pen 170 can be performed. Conversely, if the intensified light emission intensity of the light emitting element 171 is cancelled during the finger operation usable state, the power consumption by the electronic pen 170 can be reduced.

Therefore, one feature of the present embodiment as shown in FIG. 1 is that the coordinate detecting device 101 includes a unit for determining whether or not pen/finger can be utilized 107 in addition to a finger contact position detecting unit 105 and a pen contact position detecting unit 106.

In an environment as described above where light from an external source (external light) is illuminated, in the present embodiment a judgment can be made of whether finger operation is usable based on the image that is captured by the camera. When judged as a state where finger operation is unusable, the illuminating light is switched to a state specialized for electronic pens, or namely is switched to an off or dim state. In this way stable detection of the electronic pen contact position is possible even in an environment where external light is illuminated. Moreover, the effect of reducing power consumption can be obtained by turning off the illuminating light or dimming the illuminating light.

The above described embodiments are merely examples for describing the invention and are not intended to limit the scale or scope of the present invention. All manner of diverse changes may be considered for adding to the above embodiments and are all within the scope of the present invention.

REFERENCE SIGNS LIST

101: Coordinate detecting device,
102: Camera,
103: Illuminating light,
104: Illuminating light,
105: Finger contact position detecting unit,
106: Pen contact position detecting unit,
107: Unit for determining whether or not pen/finger can be used,
108: Communication unit,
109: Control unit,
120: Detection result data,
150: Device being manipulated,
151: Communication unit,
152: Settings input unit,
153: Control unit,
154: Image projecting unit,
155: Display unit,
156: Light emitting unit,
157: Sound output unit,
170: Electronic pen,
171: Light emission element,
172: Tip contact detecting unit,
173: Light emission control unit,
200: User,
201: Wall surface,
202: image-capture range,
400: Finger,
401,402: Shadow,
403,404: characteristics point,
650: Pen contact point,
651,652: Light emitting region,
941,942: Tip of shadow,
950: Finger contact point,
1101: external light,
1301, 1302: Message,
1303, 1304: Icon.

What is claimed is:

1. A projection type image display apparatus, the projection type image display apparatus comprising:
an image projector configured to project an image;
at least one or more infrared illuminators configured to illuminate an infrared light that is different from projection light from the image projector onto a manipulation surface which at least partially overlaps an image projection surface onto which the image projector projects an image;
a camera configured to capture an image of the manipulation surface based on the infrared light;
a first detector configured to perform a first detection process to detect the position where a first object being manipulated that emits light, contacts the manipulation surface;
a second detector configured to perform a second detection process to detect the position where a second object being manipulated that does not emit light, contacts the manipulation surface, and the second detection process is different from the first detection process;
a controller configured to control the operation of the projection type image display apparatus, to change at least a part of the image that is projected by the image projector based on detection results from the first detector or the second detector,
wherein the controller is configured to control to notify of a change in the state:
when changing from the state where both the first detection process and the second detection process can be performed, to a state where either one of the first detection process or the second detection process cannot be performed; and
when changing from the state where either one of the first detection process or the second detection process cannot be performed, to a state where both the first detection process and the second detection process can be performed, and
wherein the controller is configured to control to notify of a change in the state by utilizing the projected image that is projected by the image projector.

2. The projection type image display apparatus according to claim 1,
wherein the display state of the projected image from the image projector includes:
a first display state to render an indication that shows the detection processing of both the first detection process and the second detection process are functioning in the projected image; and
a second display state to render an indication that shows the first detection process is functioning but the second detection process is not functioning in the projected image.

3. The projection type image display apparatus according to claim 1,
wherein the projection type image display apparatus is configured to include an image display; and
the controller is configured to control to notify of a change in the state by displaying an image on the image display.

4. The projection type image display apparatus according to claim 1,
wherein the projection type image display apparatus is configured to include a speaker; and
the controller is configured to control to notify of a change in the state by utilizing a sound output from the speaker.

5. The projection type image display apparatus according to claim 1,
wherein the projection type image display apparatus is configured to include a light emitter; and the control unit performs control to notify of a change in the state by utilizing light emitted by the light emitter.

6. The projection type image display apparatus according to claim 1,
wherein the controller is configured to control to make at least one among infrared light intensity, infrared light emission time, infrared light emission frequency, infrared light emission pattern of the infrared illuminator different according to whether there is a state where both the first detection process and the second detection process can be performed; or a state where one among either cannot be performed.

* * * * *